United States Patent
Hirokawa et al.

(10) Patent No.: US 10,723,122 B2
(45) Date of Patent: Jul. 28, 2020

(54) IMAGE FORMING APPARATUS AND IMAGE FORMING METHOD

(71) Applicant: CANON KABUSHIKI KAISHA, Tokyo (JP)

(72) Inventors: Ryosuke Hirokawa, Kawasaki (JP); Toru Yamane, Yokohama (JP); Akihiro Mouri, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/026,215

(22) Filed: Jul. 3, 2018

(65) Prior Publication Data

US 2018/0326756 A1    Nov. 15, 2018

Related U.S. Application Data

(63) Continuation of application No. PCT/JP2016/005243, filed on Dec. 28, 2016.

(30) Foreign Application Priority Data

Jan. 5, 2016   (JP) .................................. 2016-000748
May 30, 2016  (JP) .................................. 2016-107970

(51) Int. Cl.
*B41J 2/005*  (2006.01)
*B41J 2/01*   (2006.01)
(Continued)

(52) U.S. Cl.
CPC ......... *B41J 2/0057* (2013.01); *B41J 11/0015* (2013.01); *B41J 29/17* (2013.01);
(Continued)

(58) Field of Classification Search
CPC . B41J 2/0057; B41J 29/38; B41J 29/17; B41J 11/0015; B41J 2002/012; C09D 11/54
See application file for complete search history.

(56) References Cited

U.S. PATENT DOCUMENTS

| | | |
|---|---|---|
| 10,239,330 B2 | 3/2019 | Ohnishi et al. |
| 2019/0009515 A1 | 1/2019 | Deguchi et al. |
| 2019/0009589 A1 | 1/2019 | Hirokawa et al. |

FOREIGN PATENT DOCUMENTS

| | | |
|---|---|---|
| JP | 2001-179959 A | 7/2001 |
| JP | 2008-087283 A | 4/2008 |

(Continued)

OTHER PUBLICATIONS

International Search Report and Written Opinion dated Feb. 21, 2017, in International Application No. PCT/JP2016/005243.
(Continued)

*Primary Examiner* — Geoffrey S Mruk
(74) *Attorney, Agent, or Firm* — Venable LLP

(57) ABSTRACT

In a process of an ink receiving medium entering a nip part with a liquid absorbing member, force in a direction to sweep up an image to be processed as an absorption removal treatment target is reduced by changing a nip pressure of the nip part in a conveying direction of the ink receiving medium. Furthermore, when peeling off the liquid absorbing member from the ink receiving medium from the nip part, force for pulling a liquid component toward a porous body is effectively applied. As a result, it is possible to achieve high absorption and removal of the liquid component from the image to be processed while suppressing disturbance of the image to be processed.

21 Claims, 9 Drawing Sheets

(51) Int. Cl.
  *C09D 11/54* (2014.01)
  *B41J 29/38* (2006.01)
  *B41J 11/00* (2006.01)
  *B41J 29/17* (2006.01)

(52) U.S. Cl.
  CPC .............. *B41J 29/38* (2013.01); *C09D 11/54* (2013.01); *B41J 2002/012* (2013.01)

(56) References Cited

FOREIGN PATENT DOCUMENTS

| | | | |
|---|---|---|---|
| JP | 2009-000915 A | 1/2009 | |
| JP | 2009-045851 A | 3/2009 | |
| JP | 2009-86348 | * 4/2009 | .............. B41M 7/00 |
| JP | 2009-086348 A | 4/2009 | |
| JP | 2015-098097 A | 5/2015 | |

OTHER PUBLICATIONS

International Preliminary Report on Patentability dated Jul. 19, 2018, in International Application No. PCT/JP2016/005243.
Office Action dated Apr. 25, 2019, issued in Chinese Patent Application No. 201680078088.6.
Extended European Search Report dated Jun. 3, 2019, issued in European Patent Application No. 16883548.6.
Nov. 20, 2019 Chinese Official Action in Chinese Patent Appln. No. 201680078088.6.

* cited by examiner

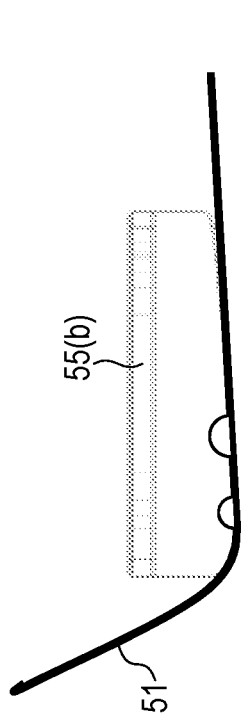
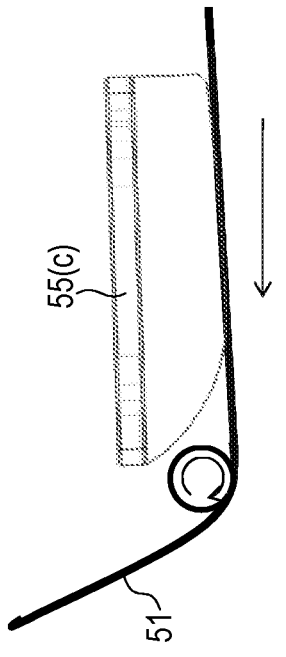
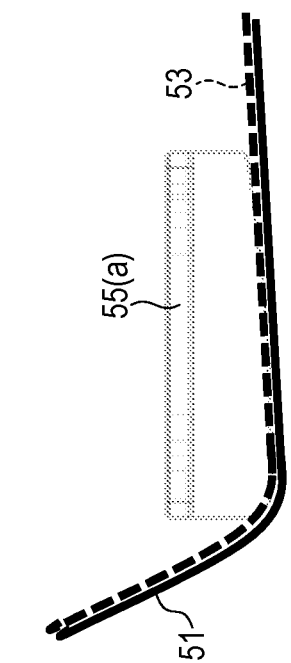
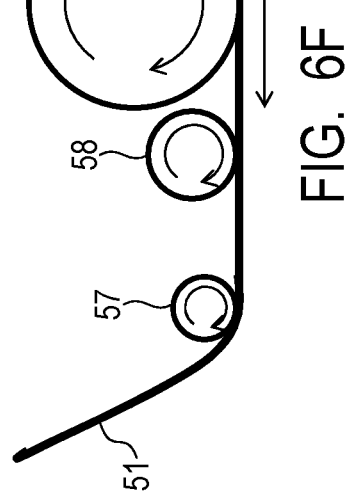
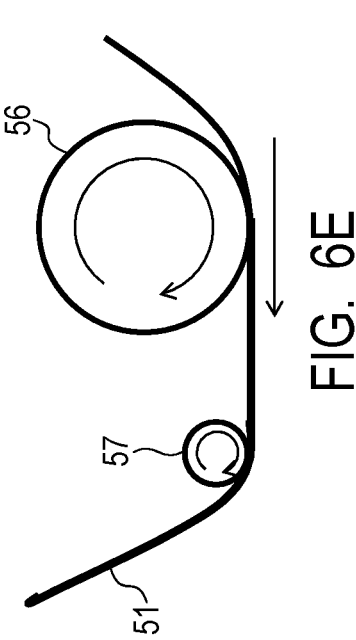

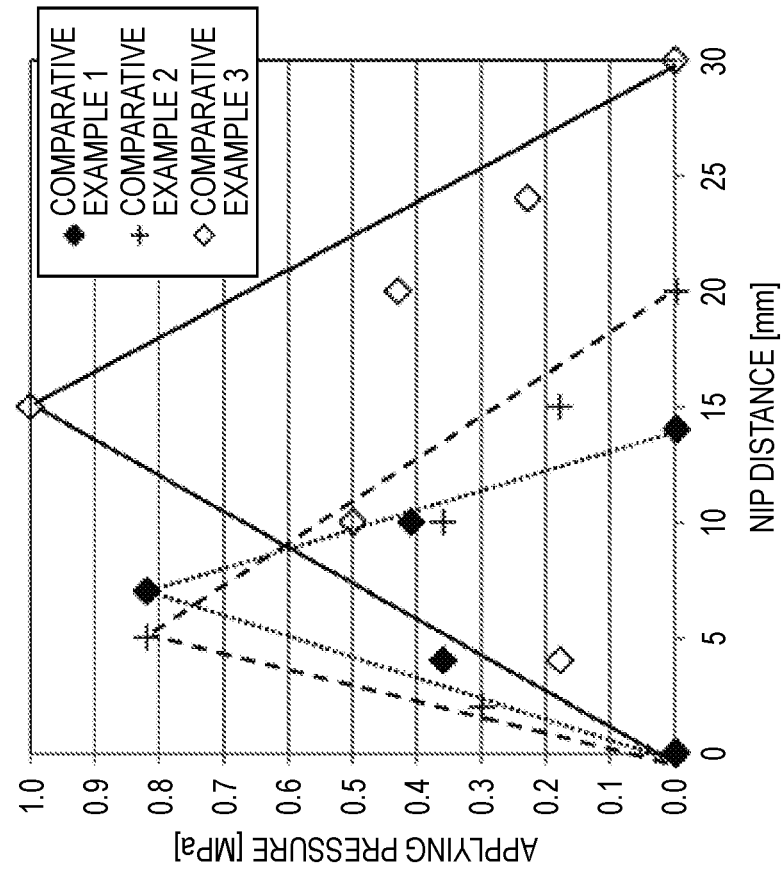
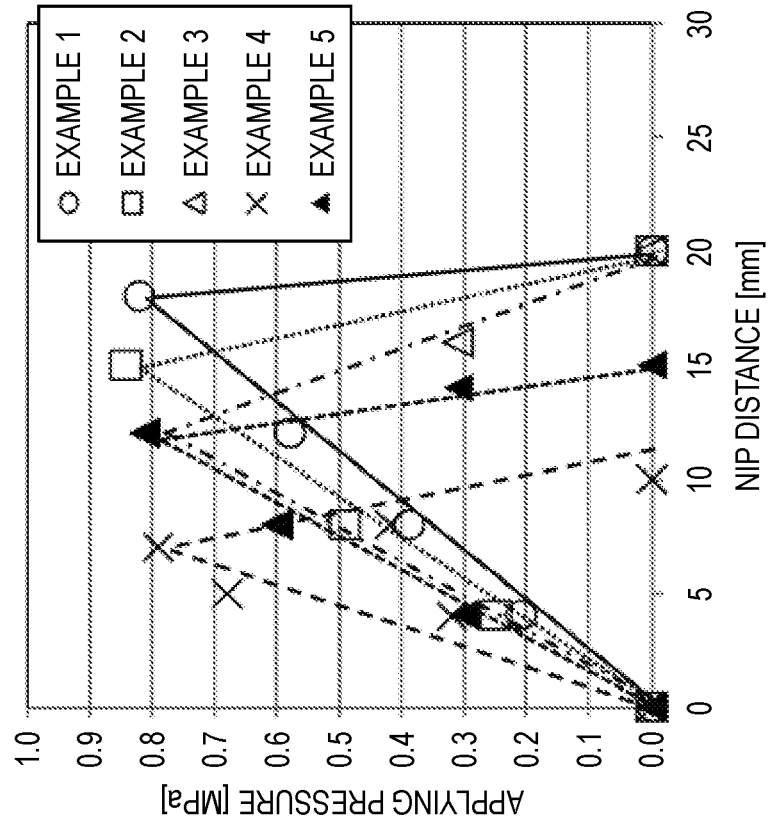

IMAGE FORMING APPARATUS AND IMAGE FORMING METHOD

CROSS-REFERENCE TO RELATED APPLICATIONS

This application is a Continuation of International Patent Application No. PCT/JP2016/005243, filed Dec. 28, 2016, which claims the benefit of Japanese Patent Application No. 2016-000748, filed Jan. 5, 2016, and Japanese Patent Application No. 2016-107970, filed May 30, 2016, all of which are hereby incorporated by reference herein in their entirety.

BACKGROUND OF THE INVENTION

Field of the Invention

The present invention relates to an image forming apparatus and an image forming method.

Description of the Related Art

In an ink-jet printing technique, an image is formed by directly or indirectly applying a liquid composition (ink) including a coloring material onto a printing medium such as paper, or the like. Here, curl or cockling occurs due to excessive absorption of a liquid component in the ink by the printing medium.

Thus, in order to quickly remove the liquid component from the ink, there is a method for drying a printing medium by warm air, infrared rays, or the like, or a method for forming an image on a transfer body, then drying a liquid component included in the image on the transfer body by thermal energy, or the like, and transferring the image to a printing medium such as paper, or the like.

In addition, as a unit for removing the liquid component included in the image on the transfer body, there has been proposed a method in which the liquid component is absorbed and removed from an ink image by contacting a roller-shaped porous body with the ink image without using thermal energy Japanese Patent Application Laid-Open No. 2009-45851). Further, there has been proposed a method in which the liquid component is absorbed and removed from the ink image by contacting a belt-shaped polymer absorber with the ink image (Japanese Patent Application Laid-Open No. 2001-179959).

Further features of the present invention will become apparent from the following description of exemplary embodiments with reference to the attached drawings.

SUMMARY OF THE INVENTION

As disclosed in Japanese Patent Application Laid-Open Nos. 2009-45851 and 2001-179959, when a roller-shaped or belt-shaped liquid absorbing member is used for absorbing and removing a liquid component from an image, a nip in which a liquid absorbing member is in contact with an ink receiving medium is formed, and the image is passed through a nip part to perform liquid absorbing treatment.

However, depending on liquid absorbency of the liquid absorbing member or forming conditions of the nip part, there may be a case where smeared image may occur during treatment by the liquid absorbing member or an intended liquid removing effect from the image by the liquid absorbing member may not be obtained.

An object of the present invention is to provide an image forming apparatus and an image forming method capable of achieving high absorption and removal of a liquid component from an image without disturbing an image by contacting a liquid absorbing porous body with the image including the liquid component.

An image forming apparatus according to the present invention includes:
an image forming unit that forms a first image including a first liquid and a coloring material on an ink receiving medium;
a liquid absorbing member that includes a porous body having a first surface and absorbing at least a portion of the first liquid from the first image, the first surface contacting the first image;
a nip part forming unit that forms a nip part by contacting the first surface formed of the porous body of the liquid absorbing member with a surface on which the first image of the ink receiving medium is formed, opposite to the first surface; and
a conveying unit that conveys the ink receiving medium contacting the first image with the first surface of the porous body by passing the first image through the nip part, wherein a ratio $A (=P1/X1)$ of a pressure peak P1 to a nip distance X1 from start of contact between the first surface of the porous body and the ink receiving medium to the pressure peak P1 close to an inlet side of the ink receiving medium of the nip part is smaller than a ratio $B (=P2/X2)$ of a pressure peak P2 to a nip distance X2 from the pressure peak P2 close to an outlet side of the ink receiving medium until the porous body and the ink receiving medium are separated.

In addition, an image forming method according to the present invention includes:
an image forming step of forming a first image including a first liquid and a coloring material on an ink receiving medium; and
a liquid absorbing step of contacting a first surface of a porous body included in a liquid absorbing member with the first image to absorb at least a portion of the first liquid from the first image by the porous body,
wherein the liquid absorbing step is performed by contacting the first surface formed of the porous body of the liquid absorbing member with a surface on which the first image of the ink receiving medium is formed, opposite to the first surface, thereby forming a nip part, and passing the first image through the nip part to contact the first image with the first surface of the porous body, and
a ratio $A (=P1/X1)$ of a pressure peak P1 to a nip distance X1 from start of contact between the first surface of the porous body and the ink receiving medium to the pressure peak P1 close to an inlet side of the ink receiving medium of the nip part is smaller than a ratio $B (=P2/X2)$ of a pressure peak P2 to a nip distance X2 from the pressure peak P2 close to an outlet side of the ink receiving medium until the porous body and the ink receiving medium are separated.

BRIEF DESCRIPTION OF THE DRAWINGS

FIG. 6A is a detailed configuration diagram of a liquid component removing unit according to the present embodiment.

FIG. 6B is a detailed configuration diagram of the liquid component removing unit according to the present embodiment.

FIG. 6C is a detailed configuration diagram of the liquid component removing unit according to the present embodiment.

FIG. 6D is a detailed configuration diagram of the liquid component removing unit according to the present embodiment.

FIG. 6E is a detailed configuration diagram of the liquid component removing unit according to the present embodiment.

FIG. 6F is a detailed configuration diagram of the liquid component removing unit according to the present embodiment.

FIG. 8A shows a change in nip pressure in the nip part in Examples 1 to 5 and Comparative Examples 1 to 3.

FIG. 8B shows a change in nip pressure in the nip part in Examples 1 to 5 and Comparative Examples 1 to 3.

DESCRIPTION OF THE EMBODIMENTS

Figure 1:
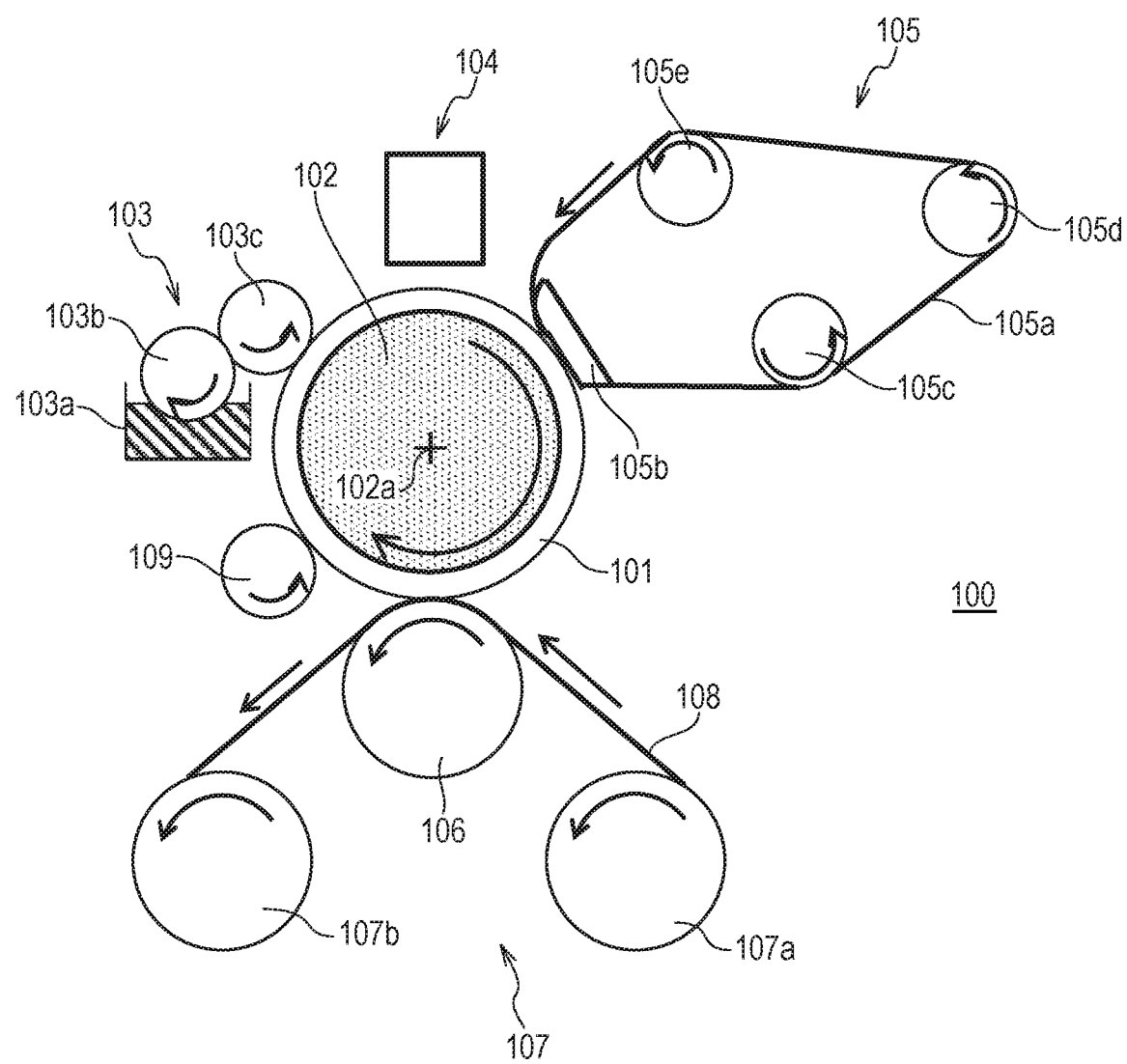
FIG. 1 is a schematic diagram showing an example of a configuration of a transfer type ink jet printing apparatus according to an embodiment of the present invention.

According to study of the present inventors, when a polymer absorber as described in Japanese Patent Application Laid-Open No. 2001-179959, that is, a superabsorbent polymer is used as a liquid absorbing member, flow resistance of the liquid absorbing member with respect to an image to be processed including a liquid component increases. For this reason, there may be a case where the liquid component is not able to be absorbed and removed from the image to be processed and but the image to be processed is swept up to cause image disturbance. In particular, when the image to be processed is pressed by a nip formed by a roll-shaped liquid absorbing member and an ink receiving medium, there may be a case where in a process in which a region where the image to be processed of the ink receiving medium is formed enters the nip part, a force in a direction to sweep up the image to be processed acts, such that image disturbance is more conspicuous. In order to solve this problem, it is effective to increase a diameter (roll diameter) of the roll-shaped liquid absorbing member and reduce the force in the direction to sweep up the image. However, when the roll diameter increases, there may be a case where an effect of removing the liquid component from the image, which is an object, is not obtainable. It is presumed because the liquid component is separated at the time of peeling the liquid absorbing member from the ink receiving medium from the nip part, and the liquid component tends to remain on an image side on the ink receiving medium.

The present inventors studied a technique for solving a technical problem of performing high absorption and removal of a liquid component from an image to be processed, which is an object, without causing image disturbance. As a result, it was newly found that this technical problem can be achieved by adjusting a change in a nip pressure in a conveying direction on the ink receiving medium in the nip part formed by the ink receiving medium and the image to be processed. The present invention was made based on this new finding by the present inventors.

Hereinafter, embodiments of an image forming method and an image forming apparatus according to the present invention will be described.

The image forming method according to the present invention includes: an image forming step of forming a first image including a first liquid and a coloring material on an ink receiving medium; a liquid absorbing step of contacting a first surface of a porous body included in a liquid absorbing member with the first image to absorb at least a portion of the first liquid from the first image by the porous body.

The first image is an image to be processed as a liquid absorbing treatment target, which is composed of an ink image including a liquid component containing a first liquid and a coloring material. That is, the first image is an ink image before liquid is removed before being subjected to liquid absorbing treatment. In the liquid absorbing step, the nip part is formed by a contact surface of the porous body included in the liquid absorbing member with the first image, that is, the first surface, and a surface having the first image of the ink receiving medium disposed to be opposite to the first surface of the porous body. The first image is passed through the nip part so as to be in contact with the first surface of the porous body, such that at least a portion of the liquid component from the first image may be removed by the porous body side, thereby obtaining a second image in which the liquid component is reduced. The second image is an ink image after liquid removal in which a content of the first liquid (aqueous liquid component) is reduced by performing the liquid absorption treatment.

A pressure applied to the surface on which the first image of the ink receiving medium passing through the nip part to be formed in the liquid absorbing step is formed, is adjusted so as to satisfy the following Relational Expressions (1) to (3) below:

$$A<B \quad (1)$$

$$A=P1/X1 \quad (2)$$

$$B=P2/X2 \quad (3)$$

In Relational Expressions (1) to (3), P1, P2, X1, X2, A, and B are defined as follows:
P1: pressure peak close to inlet side of ink receiving medium of nip part
X1: nip distance from start of contact between first surface of porous body and ink receiving medium to P1
P2: pressure peak close to outlet side of ink receiving medium of nip part X2: nip distance from P2 until porous body and ink receiving medium are separated In addition, the inlet of the ink receiving medium of the nip part at the pressure peak P1 is a tip of the nip part (the most upstream part of the nip part) in the conveying direction of the ink receiving medium, and a separation position between the porous body and the ink receiving medium at the pressure peak P2 is the rear end (the most downstream part) of the nip part. In addition, P1 is a first pressure peak on a downstream side in the conveying direction of the ink receiving medium from the tip of the nip part, and P2 is a first pressure peak on an upstream side in the conveying direction of the ink receiving medium from the rear end of the nip part. When there is only one peak of the nip pressure in the nip part, P1=P2(X1≠X2) is obtained.

The nip pressure at an arbitrary position of the first image increases by movement according to conveyance of the ink receiving medium and reaches P1, then passes through P2, and enters a released state where the nip pressure is not applied. Here, in the adjustment of the nip pressure satisfying the above Relational Expressions (1) to (3), a rate of increase in pressure up to P1 may be set low. As a result, it is possible to reduce fluid resistance of the liquid absorbing member at an initial stage after the liquid absorbing member is in contact with the first image, and it is possible to prevent the smeared image by sweeping up the first image.

Further, by increasing the nip pressure up to a peak pressure, it is possible to ensure desired high absorbability of the liquid component from the first image in the porous body. Furthermore, since a ratio of the pressure decrease from the peak pressure on the rear end side of the nip part to release from the nip pressure is set to be high, separation from the porous body from the first image may be smoothly performed, and sufficient pulling force to the porous body side of the liquid component can be obtained, such that image disturbance can be effectively prevented.

With respect to P1 and P2 values, even though not particularly limited, it is preferable that P1 is 2.94 N/cm$^2$ (0.3 kgf/cm$^2$) or more and 19.6 N/cm$^2$ (2 kgf/cm$^2$) or less to further improve an effect of removing the liquid component in the first image and to better suppress the coloring material in the first image from adhering to the liquid absorbing member. Further, in order to further improve the effect of removing the liquid component in the first image and to better suppress structural load on the image forming apparatus, P2 is preferably 2.94 N/cm$^2$ (0.3 kgf/cm$^2$) or more and 98 N/cm$^2$ (10 kgf/cm$^2$) or less.

Further, disturbance of the image to be processed due to the contact of the porous body included in the liquid absorbing member with the image to be processed is suppressed, and at the time of peeling the liquid absorbing member from the ink receiving medium from the nip part, a force for pulling up the liquid component toward the porous body works effectively. Thus, when P1 and P2 are different, it is preferable that P1<2×P2.

The image forming apparatus that can be applied to the image forming method according to the present invention includes at least an image forming unit that forms a first image including a first liquid and a coloring material on an ink receiving medium; and a liquid absorbing member that includes a porous body having a first surface and absorbing at least a portion of the first liquid from the first image, the first surface contacting the first image.

As described above, the removal of the liquid component from the first image by the liquid absorbing member is performed by passing the first image on the ink receiving medium through the nip part formed by the ink receiving medium and the porous body of the liquid absorbing member. The nip part is formed by a nip part forming unit that forms the nip part by contacting the first surface formed of the porous body of the liquid absorbing member with a surface on which the first image of the ink receiving medium is formed, opposite to the first surface. The nip pressure to the first image in the nip part is adjusted so as to satisfy the above-described Relational Expressions (1) to (3).

In the image forming apparatus of the present invention, the image forming unit is not particularly limited as long as it can form the first image including the first liquid and the coloring material on the ink receiving medium. Preferably, the image forming unit includes 1) a first liquid applying unit that applies a first liquid composition including the first liquid or a second liquid onto the ink receiving medium; and 2) a second liquid applying unit that applies a second liquid composition including the first liquid or the second liquid and the coloring material onto the ink receiving medium. At least one of the first liquid composition and the second liquid composition includes the first liquid.

The first image as a liquid absorbing treatment target is formed by applying the first liquid composition and the second liquid composition to the ink receiving medium so that they have at least overlapping regions. Fixability of the coloring material applied together with the second liquid composition onto the ink receiving medium is improved by the first liquid composition. Improvement in the fixability of this coloring material means that from an initial state in which the second liquid composition applied to the ink receiving medium has fluidity, flowability of the ink itself or flowability of the coloring material in the ink is lowered by action of the first liquid composition, and the state becomes an immobilized state which is difficult to flow as compared to the initial state. The mechanism will be described below.

The first image includes a mixture of the first liquid composition and the second liquid composition. Usually, the second liquid composition is an ink containing a liquid medium and a coloring material, and the apparatus for applying the second liquid composition onto the ink receiving medium is an ink jet printing device. Further, the first liquid composition can act chemically or physically with the second liquid composition, and thus the first image can include a component improving the fixability of the coloring material in which the mixture of the first liquid composition and the second liquid composition is viscously thicker than each of the first liquid composition and the second liquid composition. The first liquid composition can include an aqueous liquid component. The aqueous liquid component includes at least water and optionally includes a water-soluble organic solvent and various additives.

At least one of the first liquid composition and the second liquid composition may include the second liquid other than the first liquid when water is used as the first liquid. High and low volatility of the second liquid is not a problem, but a liquid having higher volatility than the first liquid is preferred.

As the first liquid, a liquid that serves as a main cause of a decrease in a fixation rate, beading of an image and the like when being at least partially included in the first image is selected. When an aqueous pigment ink is used as the second liquid composition for applying the coloring material to the ink receiving medium or when a reaction liquid containing an aqueous liquid medium (aqueous liquid component) is used as the first liquid composition, it is preferable to select water as the first liquid.

Hereinafter, embodiments in which a reaction liquid as a first liquid composition, a reaction liquid applying device as a liquid applying unit for applying the first liquid composition onto an ink receiving medium, an ink as a second liquid composition, and an ink applying device as a liquid applying unit for applying the second liquid composition onto the ink receiving medium are used will be described.

<Reaction Liquid Applying Device>

The reaction liquid applying device may be any apparatus capable of applying a reaction liquid onto an ink receiving medium, and various conventionally known apparatuses may be appropriately used. Specifically, a gravure offset roller, an ink jet head, a die coating apparatus (die coater), a blade coating apparatus (blade coater), and the like, can be included. The application of the reaction liquid by the reaction liquid applying device may be performed before or after the ink is applied as long as it can mix (react) with the ink on the ink receiving medium. Preferably, the reaction liquid is applied before the ink is applied. The application of the reaction liquid before application of the ink can suppress bleeding in which adjacently applied inks are mixed and beading in which previously impacting ink is attracted to a subsequently impacting ink, in image printing by an ink jet technique.

<Reaction Liquid>

The reaction liquid contains a component that increases a viscosity of the ink (ink viscosity-increasing component). Here, the increase in viscosity of the ink means that components constituting the ink, such as a coloring material, a resin, and the like, are in contact with the ink viscosity-increasing component to cause chemical reaction therewith or physical adsorption thereonto, so that the increase in the viscosity of the ink is observed.

The increase in viscosity of the ink includes not only a case where an increase in viscosity of the ink is confirmed but also a case where the viscosity locally increases due to aggregate of a portion of the component constituting the ink such as a coloring material, a resin, or the like. As a method of aggregating the portion of the component constituting the ink, a reaction liquid which reduces dispersion stability of the pigment in the aqueous ink can be used.

This ink viscosity-increasing component reduces fluidity of the ink and/or the portion of the component constituting the ink on the ink receiving medium to suppress bleeding or beading at the time of forming the first image. In the present invention, the increase in viscosity of the ink is also referred to as "viscously thickening the ink". Known materials such as polyvalent metal ions, organic acids, cationic polymers, porous fine particles, and the like, can be used as the ink viscosity-increasing component. Among them, polyvalent metal ions and organic acids are particularly preferable. In addition, it is preferable to contain plural kinds of ink viscosity-increasing components. Further, a content of the ink viscosity-increasing component in the reaction liquid is preferably 5 mass % or more based on the total mass of the reaction liquid.

Examples of polyvalent metal ions include divalent metal ions such as $Ca^{2+}$, $cu^{2+}$, $Ni^{2+}$, $Mg^{2+}$, $sr^{2+}$, $Ba^{2+}$, $Zn^{2+}$, and the like, and trivalent metal ions such as $Fe^{3+}$, $Cr^{3+}$, $Y^{3+}$, $Al^{3+}$, and the like.

Examples of the organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, oxysuccinic acid, dioxy succinic acid, and the like.

The reaction liquid may contain water as the first liquid, a mixture of water and a water-soluble organic solvent, and/or a low volatile organic solvent in an appropriate amount. Water used in this case is preferably deionized water by ion exchange, or the like. The organic solvent that can be used for the reaction liquid applied to the present invention is not particularly limited, and can be known organic solvents.

In addition, surface tension and viscosity of the reaction liquid may be suitably adjusted by adding a surfactant or a viscosity adjusting agent. A material to be used is not particularly limited as long as it can coexist with the ink viscosity-increasing component. Specific examples of the surfactant include an acetylene glycol ethylene oxide adduct (Product name "ACETYLENOL E100" manufactured by Kawaken Fine Chemicals Co., Ltd.), a perfluoroalkyl ethylene oxide adduct (Product name "MEGAFAC F444" manufactured by DIC Corporation), and the like.

<Ink Applying Device>

An ink jet head that ejects a liquid by an ink jet method is used, as an ink applying device that constitutes an ink jet printing unit and applies an ink. As the ink jet head, for example, a form in which film boiling occurs in the ink by an electro-thermal transducer to form bubbles, thereby ejecting ink, a form in which ink is ejected by an electro-mechanical transducer, and a form in which ink is ejected using static electricity, and the like, may be included. In the present invention, a known ink jet head can be used. Among them, in particular, from the viewpoint of high-speed and high-density printing, the electro-thermal transducer is preferably used. Drawing receives an image signal to apply an ink amount required at each position.

An ink applying amount can be expressed by the image density (duty) or ink thickness. In the present invention, an average value obtained by multiplying a mass of each ink dot by the number of applied dots and dividing the resultant by a printing area is referred to as ink applying amount ($g/m^2$). In addition, from the viewpoint of removing the liquid component in the ink, the maximum ink applying amount in an image region indicates an ink applying amount applied in an area of at least 5 $mm^2$ or more in the region used as information of an ink receiving medium.

The ink jet printing apparatus of the present invention may have a plurality of ink jet heads in order to apply ink of each color onto the ink receiving medium. For example, when each color image is formed using yellow ink, magenta ink, cyan ink, and black ink, an ink jet printing apparatus has four ink jet heads which eject each of the above four types of ink onto the ink receiving medium.

In addition, the ink applying member may include an ink jet head that ejects ink not containing a coloring material (clear ink).

<Ink>

Each component of the ink applied to the present invention will be described.

(Coloring Material)

As a coloring material contained in the ink applied to the present invention, a pigment or a mixture of a dye and a pigment can be used. The type of pigment that can be used as the coloring material is not particularly limited. Specific examples of the pigment include inorganic pigments such as carbon black and the like; organic pigments such as azo, phthalocyanine, quinacridone, isoindolinone, imidazolone, diketopyrrolopyrrole, dioxazine, and the like. These pigments may be used alone or in combination of two or more, if necessary.

The type of dye that can be used as the coloring material is not particularly limited. Specific examples of the dye include direct dyes, acidic dyes, basic dyes, disperse dyes, edible dyes, and the like, and dyes having anionic groups. Specific examples of the dye skeleton include an azo skeleton, a triphenylmethane skeleton, a phthalocyanine skeleton, an azaphthalocyanine skeleton, a xanthene skeleton, an anthrapyridone skeleton, and the like.

A content of the pigment in the ink is preferably 0.5 mass % or more and 15.0 mass % or less, and more preferably 1.0 mass % or more and 10.0 mass % or less based on the total mass of the ink.

(Dispersant)

As the dispersant for dispersing the pigment, a known dispersant used for ink for ink jet can be used. Among them, in an embodiment of the present invention, it is preferable to use a water-soluble dispersant having both a hydrophilic part and a hydrophobic part in its structure. In particular, a pigment dispersant composed of a resin obtained by copolymerizing at least a hydrophilic monomer and a hydrophobic monomer is preferably used. Each monomer used herein is not particularly limited, and any known monomer is preferably used. Specific examples of the hydrophobic monomer include styrene and other styrene derivatives, alkyl(meth)acrylate, benzyl(meth)acrylate, and the like. In addition, examples of the hydrophilic monomer include acrylic acid, methacrylic acid, maleic acid, and the like.

An acid value of the dispersant is preferably 50 mg KOH/g or more and 550 mg KOH/g or less. In addition, a weight average molecular weight of the dispersant is preferably from 1,000 to 50,000. A mass ratio (pigment:dispersant) of the pigment and the dispersant is preferably in the range of 1:0.1 to 1:3.

It is also preferable in the present invention to use a so-called self-dispersible pigment in which the pigment itself is surface-modified to be capable of being dispersed without using a dispersant.

(Resin Fine Particle)

The ink applied to the present invention can be used while containing various types of fine particles including no coloring materials. Among them, resin fine particles are preferable since the resin fine particles can effectively enhance image quality and fixability.

A material of the resin fine particles applicable to the present invention is not particularly limited, and any known resin may be suitably used. Specific examples of the resin may include homopolymers such as polyolefin, polystyrene, polyurethane, polyester, polyether, polyurea, polyamide, polyvinyl alcohol, poly(meth)acrylic acid and a salt thereof, poly(meth)acrylic acid alkyl, and polydiene, and the like, or copolymers obtainable by polymerizing a plurality of types of monomers for producing these homopolymers. The resin preferably has a weight average molecular weight (Mw) of 1,000 or more and 2,000,000 or less. An amount of resin fine particles in the ink is preferably 1 mass % or more and 50 mass % or less and more preferably 2 mass % or more and 40 mass % or less based on the total mass of the ink.

Further, in an aspect of the present invention, a resin fine particle dispersion in which the resin fine particles are dispersed in a liquid is preferably used. The dispersion technique is not particularly limited, and a so-called self-dispersing type resin fine particle dispersion in which particles are dispersed by using a resin obtained by homopolymerizing or copolymerizing one or more types of monomers having a dissociable group is preferably employed. Examples of the dissociable group include a carboxyl group, a sulfonic acid group, a phosphoric acid group, and the like. Examples of the monomer having the dissociable group include acrylic acid, methacrylic acid, and the like. Similarly, a so-called emulsion-dispersion type resin fine particle dispersion in which resin fine particles are dispersed by an emulsifier is also preferably used in the present invention. The emulsifier used herein is preferably a known surfactant, irrespective of whether a molecular weight of the surfactant is low or high. The surfactant is preferably a nonionic surfactant or a surfactant having the same charge as that of resin fine particles.

The resin fine particle dispersion used in an aspect of the present invention preferably has a dispersed particle size of 10 nm or more and 1000 nm or less, more preferably has a dispersed particle size of 50 nm or more and 500 nm or less, and further preferably has a dispersed particle size of 100 nm or more and 500 nm or less.

In producing the resin fine particle dispersion for use in an aspect of the present invention, various types of additives are preferably added for stability. Examples of the additives include n-hexadecane, dodecyl methacrylate, stearyl methacrylate, chlorobenzene, dodecylmercaptan, a blue dye (blueing agent), polymethyl methacrylate, and the like.

(Surfactant)

Ink that can be used in the present invention may include a surfactant.

Specific examples of the surfactant include an acetylene glycol ethylene oxide adduct (Acetylenol E100, manufactured by Kawaken Fine Chemicals Co., Ltd.), or the like. An amount of the surfactant in the ink is preferably 0.01 mass % or more and 5.0 mass % or less based on the total mass of the ink.

(Water and Water-Soluble Organic Solvent)

Ink used in the present invention may include an aqueous liquid medium, such as water as a solvent, a mixture of water and water-soluble organic solvent, or the like. Water is preferably water deionized by ion exchange, or the like. In addition, a content of water in the ink is preferably 30 mass % or more and 97 mass % or less and more preferably 50 mass % or more and 95 mass % or less based on the total mass of the ink.

As an aqueous ink that includes at least water as a liquid medium, an aqueous pigment ink including at least a pigment as a coloring material can be used. Further, the water-soluble organic solvent used in the present invention is not particularly limited in view of the kind, and all of any known organic solvents may be used. Specific examples of the organic solvent include glycerin, diethylene glycol, polyethylene glycol, polypropylene glycol, ethylene glycol, propylene glycol, butylene glycol, triethylene glycol, thiodiglycol, hexylene glycol, ethylene glycol monomethyl ether, diethylene glycol monomethyl ether, 2-pyrrolidone, ethanol, methanol, and the like. Two or more kinds selected from these organic solvents may be mixed to be used. In addition, a content of the water-soluble organic solvent in the ink is preferably 3 mass % or more and 70 mass % or less based on the total mass of the ink.

(Other Additives)

Ink that can be used in the present invention may contain various additives as necessary, such as a pH adjuster, a rust preventive agent, an antiseptic agent, a mold proofing agent, an oxidation inhibitor, a reduction inhibitor, a water-soluble resin and a neutralizer thereof, a viscosity modifier, and the like, in addition to the components described above.

<Liquid Absorbing Member>

In the present invention, at least a portion of a first liquid is in contact with a liquid absorbing member including a porous body to be absorbed from a first image, and thus a content of a liquid component in the first image is reduced. A contact surface of the liquid absorbing member being in contact with the first image is set to be a first surface, and the porous body is disposed on the first surface.

(Porous Body)

The porous body of the liquid absorbing member according to the present invention is preferably a porous body in which an average pore diameter on the first surface side is smaller than an average pore diameter on the second surface side opposite to the first surface. To suppress adhesion of a coloring material in an ink to the porous body, the pore diameter is preferably as small as possible, and at least the average pore diameter of the porous body on the first surface side that is in contact with an image is preferably 10 µm or less. On the other hand, to enhance absorption of liquid component in the porous body, at least the average pore diameter of the porous body on the first surface side that is in contact with the image is preferably 0.05 µm or more. In addition, the average pore diameter in the present invention refers to an average diameter at a surface of the first surface or the second surface, and can be measured by known means such as a mercury intrusion porosimetry method, a nitrogen adsorption method, an SEM image observation, or the like.

In addition, to obtain uniformly high air permeability, the porous body is preferably thin. The air permeability can be represented by a Gurley value defined in JIS P8117, and the Gurley value is preferably 10 seconds or less. However, since a thin porous body might fail to sufficiently secure a capacity required for absorbing liquid components, the porous body can have a multilayer structure. Further, in the liquid absorbing member, only a layer that is in contact with a first image may be the porous body, and a layer that does not contact the first image may not be the porous body.

<Multilayer Structure>

An embodiment in a case where a porous body has a multilayer structure will now be described. In the following description, a layer that is in contact with a first image is described as a first layer, and a layer that is laminated on a surface opposite to a contact surface with the first image of the first layer is described as a second layer. In addition, layers constituting the multilayer structure are sequentially described from the first layer in the order of lamination. Further, in the present specification, the first layer is also referred to as an "absorption layer" and a layer including the second and subsequent layers is also referred to as a "support layer".

[First Layer]

In the present invention, a material of the first layer is not particularly limited, and any of a hydrophilic material having a contact angle with water of less than 90° or a water-repellent material having a contact angle with water of 90° or more may be used. In the hydrophilic material, the contact angle with water is preferably 40° or less. In a case where the first layer is composed of the hydrophilic material, there is provided an effect in which an aqueous liquid component can be sucked by a capillary force.

Examples of the hydrophilic material include polyolefin (e.g., polyethylene (PE), polypropylene (PP), or the like), polyurethane, nylon, polyamide, polyester (e.g., polyethylene terephthalate (PET), or the like), polysulfone (PSF), and the like.

Meanwhile, to suppress adhesion of the coloring material and to increase cleanability, the material of the first layer is preferably a water-repellent material having a low surface free energy, particularly, a fluororesin. Specific examples of the fluororesin include polytetrafluoroethylene (hereinafter referred to as PTFE), polychlorotrifluoroethylene (PCTFE), polyvinylidene fluoride (PVDF), polyvinyl fluoride (PVF), perfluoro-alkoxyfluoro resin (PFA), tetrafluoroethylene-hexafluoropropylene copolymer (FEP), ethylene-tetrafluoroethylene copolymer (ETFE), ethylene-chlorotrifluoroethylene copolymer (ECTFE), and the like. One or two or more of these resins may be used as necessary, and the resin may have a structure in which a plurality of films are laminated in the first layer.

When the first layer is formed of a water-repellent material, aqueous liquid components are hardly sucked by a capillary force, and consequently it can take a long time to suck the aqueous liquid components when the layer is first in contact with an image. Thus, the first layer is preferably impregnated with a liquid having a contact angle with the first layer of less than 90°. The liquid to be impregnated into the first layer with respect to the first liquid and the optional second liquid in the first image may be referred to as a third liquid. The third liquid can be impregnated into the first layer by applying it from the first surface of the liquid absorbing member. The third liquid is preferably prepared by mixing a surfactant and a liquid having a low contact angle with the first layer in the first liquid (water). Since the third liquid is gradually substituted with the first liquid, an absorption efficiency of the first layer gradually decreases. Thus, it is preferable to apply the third liquid to the first surface of the liquid absorbing member using a third liquid applying means every predetermined number of times.

In the present invention, a film thickness of the first layer is preferably 50 µm or less. The film thickness is more preferably 30 µm or less. In the present Examples, the film thickness can be obtained by measuring film thicknesses of arbitrary 10 points with a straight type micrometer OMV_25 (manufactured by Mitutoyo) and calculating an average value.

The first layer can be produced by a known method for producing a thin film porous film. For example, a sheet type material is obtained by using a resin material with a method such as extrusion molding, or the like, then stretched to a predetermined thickness, thereby obtaining the first layer. Further, a plasticizer such as paraffin, or the like, can be added to the material at the time of extrusion molding, and the plasticizer can be removed by heating, or the like at the time of stretching, thereby being obtained as a porous film. The pore diameter can be adjusted by appropriately adjusting an addition amount of the plasticizer, a stretch ratio, and the like.

[Second Layer]

In the present invention, the second layer is preferably an air permeable layer. This layer may be a nonwoven fabric or a woven fabric of resin fibers. The second layer is not particularly limited in view of a material, but is preferably a material having a contact angle with a first liquid that is substantially equal to or less than the contact angle with a first liquid with respect to the first layer so that a liquid absorbed in the first layer side does not flow back. Specifically, the material of the second layer is preferably selected from polyolefin (e.g., polyethylene (PE), polypropylene (PP), and the like), polyurethane, nylon, polyamide, polyester (e.g., polyethylene terephthalate (PET), and the like), a single material such as polysulfone (PSF), or a composite material thereof, and the like. In addition, the second layer preferably has a pore diameter larger than that of the first layer.

[Third Layer]

In the present invention, a porous body having a multilayer structure may include three or more layers. The 3rd layer (also referred to as a third layer) and subsequent layers are preferably nonwoven fabrics, from the viewpoint of rigidity. A material that is the same as those for the second layer is used.

[Other Materials]

In addition to the porous body having the lamination structure described above, the liquid absorbing member may include a reinforcing member for reinforcing a side surface of the liquid absorbing member. In addition, the liquid absorbing member may include a joint member that joins longitudinal ends of a long sheet-shaped porous body together to form a belt-shaped member. As the material, a non-porous tape material, or the like, may be used, and may be disposed at a position or in a cycle at which the material does not contact with an image.

[Method for Producing Porous Body]

A method for forming a porous body by laminating a first layer and a second layer is not particularly limited. The layers may be simply overlaid with each other or may be bonded together by lamination by an adhesive agent, lamination by heating, or the like. From the viewpoint of air permeability, the lamination by heating is preferable in the present invention. For example, the first layer and the second layer may be partially melted to be bonded and laminated by heating. Alternatively, a welding material such as a hot-melt powder may be interposed between the first layer and the second layer to bond and laminate the first and second layers to each other by heating. In the case of laminating the third and subsequent layers, these layers may be laminated at a time, or may be sequentially laminated. The order of the lamination may be appropriately selected. In the heating process, a lamination method of heating the porous body while pressing the porous body interposed therebetween with a heated roller is preferable.

A specific embodiment of an ink jet printing apparatus according to the present invention will now be described. The ink jet printing apparatus includes an ink jet printing apparatus that forms a first image on a transfer body as an ink receiving medium and transfers, onto a printing medium, a second image after a liquid absorbing member absorbs the first liquid (aqueous liquid component); and an ink jet printing apparatus that forms the first image on the printing medium as the ink receiving medium. Further, in the present invention, a former ink jet printing apparatus will be hereinafter referred to as a transfer type ink jet printing apparatus for convenience of description, and a latter ink jet printing apparatus will be hereinafter referred to as a direct drawing type ink jet printing apparatus for convenience of description.

Each ink jet printing apparatus will now be described.

(Transfer Type Ink Jet Printing Apparatus)

FIG. 1 is a schematic diagram showing an example of a configuration of a transfer type ink jet printing apparatus according to an embodiment of the present invention.

A transfer type ink jet printing apparatus 100 includes a transfer body 101 to temporarily hold a first image; and a second image in which at least a portion of an aqueous liquid component is absorbed and removed from the first image. The transfer type ink jet printing apparatus 100 also includes a transfer unit including a pressing member for transferring to transfer the second image onto a printing medium 108 on which an image is to be formed, that is, a printing medium to form a final image in accordance with an intended application.

The transfer type ink jet printing apparatus 100 of the present invention includes a transfer body 101 supported by a support member 102; a reaction liquid applying device 103 that applies a reaction liquid onto the transfer body 101; an ink applying device 104 that applies an ink onto the transfer body 101 provided with the reaction liquid to form an ink image (first image) on the transfer body; a liquid absorbing device 105 that absorbs a liquid component from the first image on the transfer body; and a pressing member 106 that transfers the second image on the transfer body from which the liquid component is removed onto a printing medium 108 such as paper by pressing the printing medium. In addition, the transfer type ink jet printing apparatus 100 may further include a cleaning member 109 for transfer body that cleans a surface of the transfer body 101 after the second image is transferred onto the printing medium 108.

A support member 102 rotates about a rotation axis 102a in a direction indicated by an arrow in FIG. 1. The rotation of the support member 102 causes the transfer body 101 to move. Onto the moving transfer body 101, the reaction liquid and the ink are sequentially applied by the reaction liquid applying device 103 and the ink applying device 104, respectively, thereby forming the first image on the transfer body 101. The movement of the transfer body 101 causes the first image formed on the transfer body 101 to move to a location at which the first image is in contact with a liquid absorbing member 105a of the liquid absorbing device 105. The liquid absorbing member 105a of the liquid absorbing device 105 moves in synchronization with rotation of the transfer body 101. The first image formed on the transfer body 101 has a state of being in contact with the moving liquid absorbing member 105a. During this time, the liquid absorbing member 105a removes the liquid component from the first image.

In addition, the liquid component included in the first image is removed by passing through the state of contact with the liquid absorbing member 105a. In this contacting state, the liquid absorbing member 105a is preferably pressed against the first image under a predetermined pressing force, so that the liquid absorbing member 105a effectively functions.

The removal of the liquid components can be expressed, from a different point view, as concentrating the ink constituting the first image formed on the transfer body. Concentrating the ink means that the proportion of the solid content contained in the ink, such as coloring material and resin, with respect to the liquid component contained in the ink increases owing to reduction in the liquid component.

Then, movement of the transfer body 101 causes the second image after the liquid component is removed to move to a transfer unit in which the second image is in contact with the printing medium 108 to be conveyed by a printing medium conveying device 107. While the second image is in contact with the printing medium 108, the pressing member 106 presses the printing medium 108, thereby transferring an ink image on the printing medium 108. The post-transfer ink image transferred onto the printing medium 108 is a reverse image of the second image. In the following description, this post-transfer ink image may be referred to as a third image separately from the above-described first image (ink image before liquid removal) and second image (ink image after liquid removal).

In addition, since the first image is formed on the transfer body by applying the reaction liquid and then the ink, the reaction liquid is not reacted with the ink but remains on a non-image region (non-ink image forming region). In this apparatus, the liquid absorbing member 105a is in contact with not only the first image but also with an unreacted reaction liquid, and a liquid component of the reaction liquid is also removed on the surface of the transfer body 101.

Thus, in the above description, it is expressed and described that the liquid component is removed from the first image. However, this expression does not strictly mean that the liquid component is removed only from the first image but means that it is sufficient to remove the liquid component at least from the first image on the transfer body. For example, the liquid component in the reaction liquid applied onto a region outside the first image as well as the first image may be removed.

Further, the liquid component is not specifically limited as long as the liquid component does not have a certain shape and has fluidity and a substantially constant volume. Examples of the liquid component include water and an organic solvent, and the like, included in the ink or the reaction liquid.

In addition, even in the case where the above-described clear ink is included in the first image, the ink can also be concentrated by a liquid absorbing process. For example, in a case where the clear ink is applied onto that color ink containing a coloring material applied onto the transfer body 101, the clear ink is present over the entire surface of the first image or the clear ink is partially present at one position or a plurality of positions on the surface of the first image, and the color ink is present on the other portions of the surface of the first image. At a position of the first image where the clear ink is present over the color ink, the porous body absorbs a liquid component of the clear ink on the surface of the first image, and the liquid component of the clear ink moves. Accordingly, the liquid component in the color ink moves to the porous body, and thus an aqueous liquid component in the color ink is absorbed. Meanwhile, at a position where both a region of the clear ink and a region of the color ink are present on the surface of the first image, each liquid component of the color ink and the clear ink moves to the porous body, and thus the aqueous liquid component is absorbed. In addition, the clear ink may include a large amount of component for enhancing transferability of an image from the transfer body 101 to the printing medium. For example, a content of a component of which adhesiveness to the printing medium is higher than adhesiveness of the color ink by heating, may be increased.

A conveying unit of the ink receiving medium in the apparatus shown in FIG. 1 can include a support member 102 and a driving device (not shown) for rotatably driving the support member 102.

Each configuration of the transfer type ink jet printing apparatus according to the present embodiment will be described below.

<Transfer Body>

A transfer body 101 includes a surface layer including an image forming surface. As a member of the surface layer, various materials such as resin and ceramic can be appropriately used, but from the viewpoint of durability, and the like, a material having high compressive elastic modulus is preferable. Specific examples of the material include acrylic resin, acrylic silicone resin, fluorine-containing resin, condensates obtainable by condensing a hydrolyzable organic silicon compound, and the like. To enhance wettability and transferability of the reaction liquid, or the like, surface treatment may be performed. Examples of the surface treatment include a frame treatment, a corona treatment, a plasma treatment, a polishing treatment, a roughening treatment, an activation energy ray irradiation treatment, an ozone treatment, a surfactant treatment, a silane coupling treatment, and the like. A plurality of these treatments may be combined. In addition, an arbitrary surface shape can also be installed on the surface layer.

In addition, the transfer body preferably has a compressible layer having a function of absorbing pressure fluctuation. By installing the compressible layer, the compressible layer absorbs deformation, disperses its fluctuation against local pressure fluctuation, and can maintain good transferability even during high speed printing. Examples of a member of the compressible layer include acrylonitrile-butadiene rubber, acrylic rubber, chloroprene rubber, urethane rubber, silicone rubber, and the like. In molding the rubber material, it is preferred that a predetermined amount of a vulcanizing agent, a vulcanization accelerator, or the like is blended, and a filler such as a foaming agent, hollow fine particles, common salt, or the like, is further blended as necessary to form a porous material. As a result, since a bubble portion is compressed with volume change for various pressure fluctuations, deformation in a direction other than the compression direction is small, and more stable transferability and durability can be obtained. In the porous rubber material, there are a continuous pore structure in which each pore is continuous to each other and an independent pore structure in which each pore is independent from each other. In the present invention, either of the structures may be employed, or both of the structures may be employed in combination.

In addition, the transfer body preferably includes an elastic layer between the surface layer and the compressible layer. As a member of the elastic layer, various materials such as resin, ceramics, and the like, can be appropriately used. In view of processing properties, various elastomer materials and rubber materials are preferably used. Specific examples of the material include fluoro silicone rubber, phenyl silicone rubber, fluororubber, chloroprene rubber, urethane rubber, nitrile rubber, ethylene propylene rubber, natural rubber, styrene rubber, isoprene rubber, butadiene rubber, ethylene/propylene/butadiene copolymer, and nitrile butadiene rubber, and the like. In particular, silicone rubber, fluoro silicone rubber, and phenyl silicone rubber are preferably used in view of dimensional stability and durability since these materials have low compression set. In addition, these materials are preferable in view of transferability since a change in elastic modulus by temperature is small.

Between layers (surface layer, elastic layer, and compressible layer) constituting the transfer body, various adhesives or a double sided tape may be used for fixing and holding these layers. In addition, a reinforcing layer having a high compressive elastic modulus may be installed to suppress lateral extension caused when mounted in an apparatus and to retain compressive elastic modulus. In addition, the woven fabric may be used as a reinforcing layer. The transfer body can be produced by arbitrarily combining each layer by the above-described material.

A size of the transfer body may be freely selected depending on an intended size of a printed image. The transfer body is not particularly limited in view of a shape, but specifically may have a sheet shape, a roller shape, a belt shape, an endless web shape, or the like.

<Support Member>

The transfer body 101 is supported on the support member 102. As a method for supporting the transfer body, various adhesives or a double sided tape may be used. Alternatively, the transfer body may be supported on the support member 102 by using an installation member, specifically by attaching the installation member formed of a metal, ceramic, a resin, or the like, to the transfer body.

The support member 102 needs to have a structural strength to some degree from the viewpoints of conveyance accuracy and durability. For a material of the support member, metal, ceramic, resin, or the like is preferably used. Among them, particularly, in order to enhance responsiveness of control by reducing an inertia during operation in addition to rigidity and dimensional accuracy that can withstand pressurization at the time of transfer, aluminum, iron, stainless steel, acetal resin, epoxy resin, polyimide, polyethylene, polyethylene terephthalate, nylon, polyurethane, silica ceramics, alumina ceramics are preferably used. It is also preferable to use a combination of these materials.

<Reaction Liquid Applying Device>

The ink jet printing apparatus of the present embodiment has a reaction liquid applying device 103 that applies a reaction liquid onto a transfer body 101. The reaction liquid applying device 103 shown in FIG. 1 is a gravure offset roller including a reaction liquid storage unit 103a that stores the reaction liquid, and reaction liquid applying units 103b and 103c that apply the reaction liquid in the reaction liquid storage unit 103a onto the transfer body 101.

<Ink Applying Device>

The ink jet printing apparatus of the present embodiment has an ink applying device 104 that applies an ink onto the transfer body 101 onto which a reaction liquid is applied. A first image is formed by mixing the reaction liquid and the ink, and the liquid component is absorbed from the first image by the liquid absorbing device 105 described below.

<Liquid Absorbing Device>

The liquid absorbing device 105 in the present embodiment includes a liquid absorbing member 105a, and a pressing member 105b for liquid absorption that presses the liquid absorbing member 105a against the first image on the transfer body 101. In addition, the liquid absorbing member 105a and the pressing member 105b are not particularly limited in view of shapes. For example, as shown in FIG. 1, the liquid absorbing device 105 may have a configuration in which the pressing member 105b has a semicylindrical cross-sectional shape (a shape having a partially curved surface portion), the liquid absorbing member 105a has a belt shape, the curved surface portion of the pressing member 105b presses the liquid absorbing member 105a while sliding the liquid absorbing member 105a (in a sliding state) to press the liquid absorbing member 105a against the transfer body 101. In addition, the liquid absorbing device 105 may have a configuration in which the pressing member 105b has a columnar shape, the liquid absorbing member 105a has a cylindrical shape formed on a peripheral surface of the pressing member 105b having a columnar shape, and the liquid absorbing member 105a having a cylindrical shape is pressed against the transfer body by the pressing member 105b having a columnar shape.

In the present invention, in consideration of space in the ink jet printing apparatus, or the like, the liquid absorbing member 105a preferably has a belt shape. In addition, the liquid absorbing device 105 including the liquid absorbing member 105a having the belt shape may include an extending member that extends the liquid absorbing member 105a. In FIG. 1, reference numerals 105c, 105d, and 105e denote extending rollers serving as extending members. In FIG. 1, the pressing member 105b is a roller member that rotates in a manner similar to the extending roller, but the pressing member is not limited thereto.

In the liquid absorbing device 105, the liquid absorbing member 105a including a porous body is pressed against the first image by the pressing member 105b, and thus the liquid component included in the first image is absorbed in the liquid absorbing member 105a to be removed from the first image. As a method for removing the liquid component in the first image, in addition to the present method of pressing the liquid absorbing member, various other conventionally used methods such as a method by heating, a method for blowing low-humidity air, a method for reducing pressure, and the like, may be used in combination.

Various requirements and configurations in the liquid absorbing device 105 will be described in detail.

(Pretreatment)

In the present embodiment, before the liquid absorbing member 105a including the porous body is in contact with the first image, pretreatment is preferably performed with a pretreatment unit (not shown in FIGS. 1 and 2) that applies a wetting liquid (third liquid) to the liquid absorbing member. The wetting liquid used in the present invention preferably includes water and a water-soluble organic solvent. Water is preferably water deionized by ion exchange, or the like. Further, the water-soluble organic solvent is not particularly limited in view of the kind, and all of any known organic solvent such as ethanol, isopropyl alcohol, or the like, may be used. In the pretreatment of the liquid absorbing member used in the present invention, the method of applying the wetting liquid is not particularly limited, but immersion or dropping of droplets is preferably employed.

(Pressing Condition)

A pressure of the liquid absorbing member pressed against the first image on the transfer body is preferably 2.94 N/cm$^2$ (0.3 kgf/cm$^2$) or more, since the liquid component in the first image can be solid-liquid separated in a shorter time, and the liquid component can be removed from the first image. In addition, in the present invention, the pressure of the liquid absorbing member refers to a nip pressure between the transfer body 101 and the liquid absorbing member 105a, and a value is calculated by performing surface pressure measurement with a surface pressure distribution measuring device (I-SCAN, manufactured by Nitta Corporation) and dividing a weight in the pressed region by an area.

(Nip Distance)

In the above-described surface pressure measurement, a pressure sensing width in a conveying direction of the ink receiving medium is referred to as a nip distance.

(Pressure Ratio)

A nip pressure at a nip part is adjusted so as to obtain a preset pressure change in the conveying direction of the ink receiving medium satisfying the above exemplified Relational Expressions (1) to (3). A nip pressure adjusting unit for satisfying Relational Expressions (1) to (3) can be configured to include an ink receiving medium, a liquid absorbing member, and a pressurizing mechanism for pressing the liquid absorbing member against the ink receiving medium. As the pressurizing mechanism, a configuration in which the pressing member is connected to a pressurizing device based on a hydraulic method, or the like, can be used as long as at least one of the ink receiving medium and the liquid absorbing member is pressed with a desired pressure when necessary to apply a nip pressure change in the nip part satisfying Relational Expressions (1) to (3), and there is no particular limitation. When pressing from the side of the ink receiving medium, a form in which a pressing member, on which pressure from the pressing mechanism acts, is disposed, on a surface having the first image of the ink receiving medium and a surface side opposite thereto or a form in which a pressing force to the liquid absorbing member by the ink receiving medium is obtained by a member extending the ink receiving medium may be used. In addition, when the liquid absorbing member is pressed by the pressing mechanism, a support member may be disposed and pressed on an opposite side with the ink receiving medium interposed therebetween with respect to a pressure acting part.

A preferable form of the pressing mechanism for obtaining a change in nip pressure satisfying Relational Expressions (1) to (3), and an example of a positional relationship between the pressing member and the liquid absorbing member are shown in FIGS. 6A to 6F as a longitudinal cross section along a conveying direction of the liquid absorbing member. In addition, even though the ink receiving medium having the first image is omitted in FIGS. 6A to 6F, the ink receiving medium is conveyed together with a liquid component removing belt 51 in a state where the ink receiving medium is in contact on the first surface of the porous body of the liquid component removing belt 51, which is a belt-like liquid absorbing member.

The pressing member 55(a) in the form shown in FIG. 6A has a curved surface portion along a conveying direction on a contact surface with the liquid component removing belt 51. The pressing member 55(a) can apply a nip pressure to the nip part by applying a pressure onto a contact surface with the liquid component removing belt 51 and a surface opposite to the contact surface.

The contact surface of the pressing member 55(a) with the liquid component removing belt 51 is a sliding surface with respect to the surface of the liquid component removing belt 51 on which the first image is formed, and is formed with a convex curved surface (curved surface portion) projecting toward the liquid component removing belt 51 along the conveying direction of the liquid component removing belt 51. A peak of the convex curved surface, that is, a peak of a thickness of the liquid absorbing member is installed on a downstream side (a rear end side of the nip part) rather than an intermediate point in the conveying direction of the liquid component removing belt 51 of the pressing member 55(a). With this shape, it is possible to obtain a change in the nip pressure satisfying the above Relational Expressions (1) to (3). In addition, a cross-sectional shape of the pressing member 55(a) at an arbitrary position in a direction intersecting with the conveying direction of the liquid component removing belt 51 is the same.

The pressing member 55(b) shown in 6B has a shape in which notch is installed in a portion of the convex curved surface projecting toward the liquid component removing belt 51 in a direction intersecting with the conveying direction, and the pressure is once releasable or a plurality of peak pressures are applicable.

As shown in FIG. 6C, the pressing member 55(a) may be configured to apply pressure to the liquid component removing belt 51 with a conveying auxiliary belt 53 interposed therebetween. It is preferable that the conveying auxiliary belt 53 maintains a contact state with the liquid component removing belt 51 and has lubricity (slipperiness) with respect to the pressing member 55(a). By using the conveying auxiliary belt, abrasion of the pressing member can be suppressed. Further, the lubricity of the contact surface of the conveying auxiliary belt with the pressing member can be obtained by a method of forming the contact surface with a lubricating material, a method of adding a lubricant, or the like. A material of the conveying auxiliary belt is not particularly limited, but for example, an endless belt-like polyimide belt, an endless belt-like urethane rubber coated with silicone rubber, a sheet obtained by laminating silicone rubber on a PET film, a laminated material obtained by forming a polysiloxane compound on a urethane rubber sheet, and the like, are preferably used.

FIGS. 6D to 6F show a configuration using a plurality of pressing members. FIG. 6D shows a configuration in which the pressing roller 57 is combined with a pressing member 55(c) having a different curvature of a curved surface portion being in contact with the liquid component removing belt 51 from those of the pressing members 55(a) and 55(b). FIG. 6E shows a configuration in which two pressing rollers 56 and 57 are installed as pressing members. FIG. 6F shows a configuration in which three pressing rollers 56, 57 and 58 are installed. As described above, by disposing the plurality of pressing members with respect to the conveying direction of the liquid component removing belt 51 by selecting a size and pressing force in which an intended change in nip pressure is obtainable, the change in nip pressure satisfying Relational Expressions (1) to (3) can be obtained.

In addition, as shown in FIGS. 6B, 6D to 6F, the nip part may include a portion to which the nip pressure is not applied.

Figure 7A:
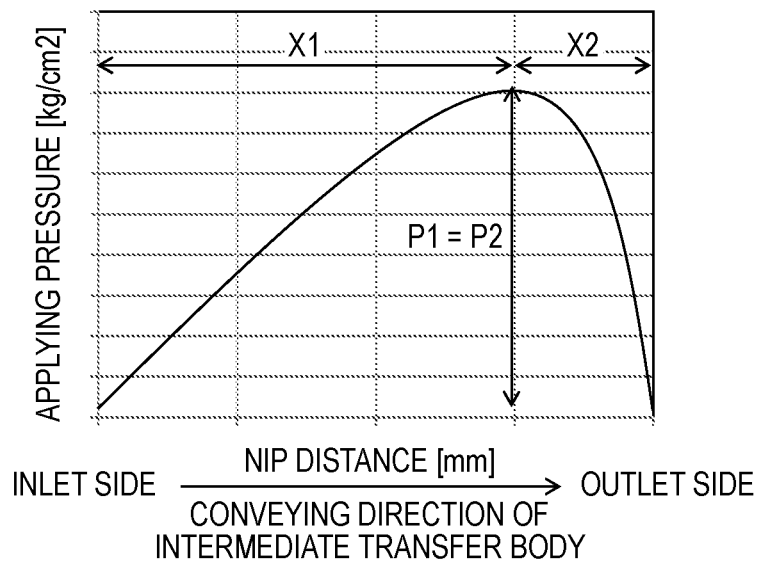
FIG. 7A shows a change in nip pressure in a nip part formed in the liquid component removing unit according to the present embodiment.
Figure 7B:
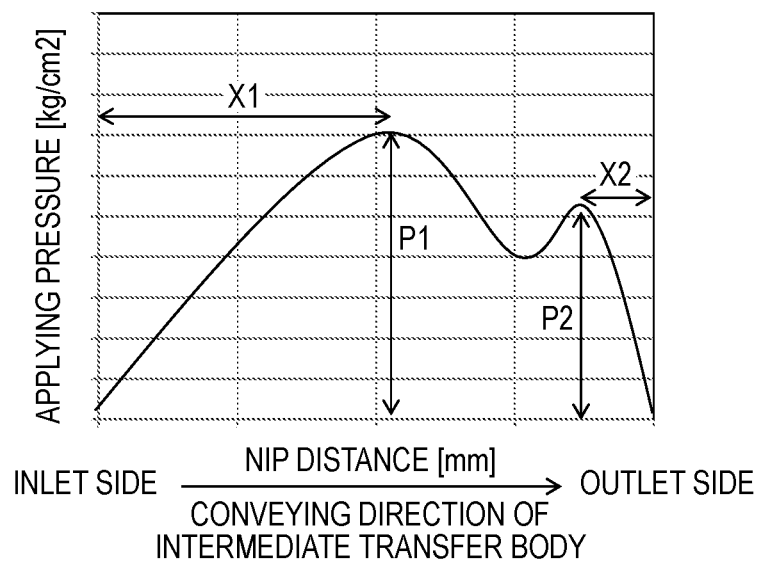
FIG. 7B shows a change in nip pressure in the nip part formed in the liquid component removing unit according to the present embodiment.

A schematic example of a profile of a change in nip pressure obtainable by a form of the pressing member shown in FIG. 6A is shown in FIG. 7A. In addition, FIG. 7B shows a schematic example of the profile of the change in nip pressure obtainable by a form of the pressing member installed with one notch in the form in FIG. 6B. In addition, FIG. 7F shows a schematic example of a profile of a change in nip pressure obtainable by a form of a pressing member installed with two notches that are the same.

Figure 7C:
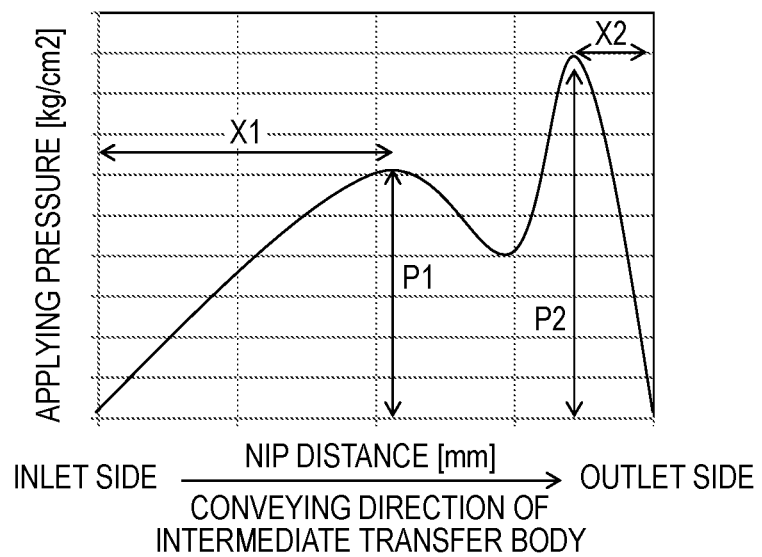
FIG. 7C shows a change in nip pressure in the nip part formed in the liquid component removing unit according to the present embodiment.
Figure 7D:
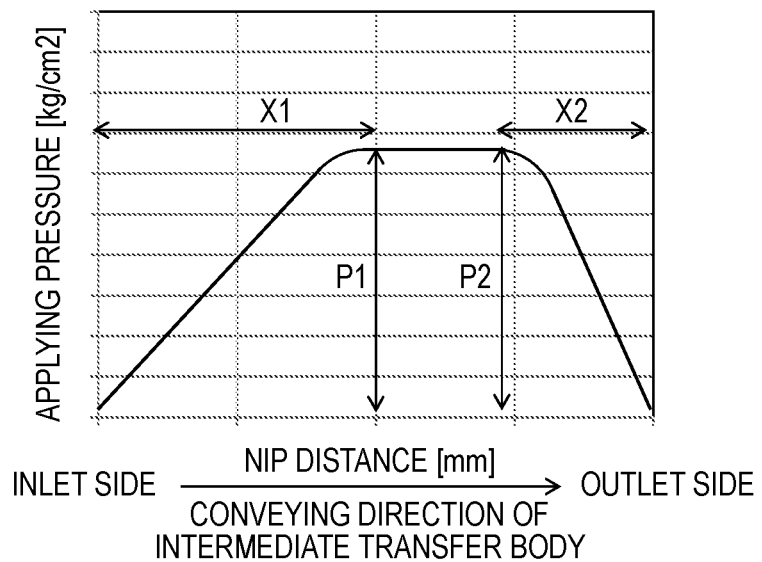
FIG. 7D shows a change in nip pressure in the nip part formed in the liquid component removing unit according to the present embodiment.
Figure 7E:
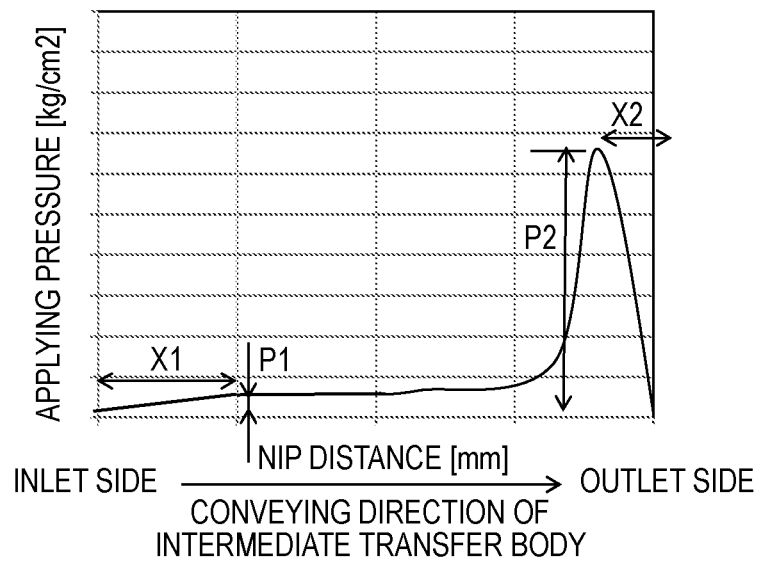
FIG. 7E shows a change in nip pressure in the nip part formed in the liquid component removing unit according to the present embodiment.
Figure 7F:
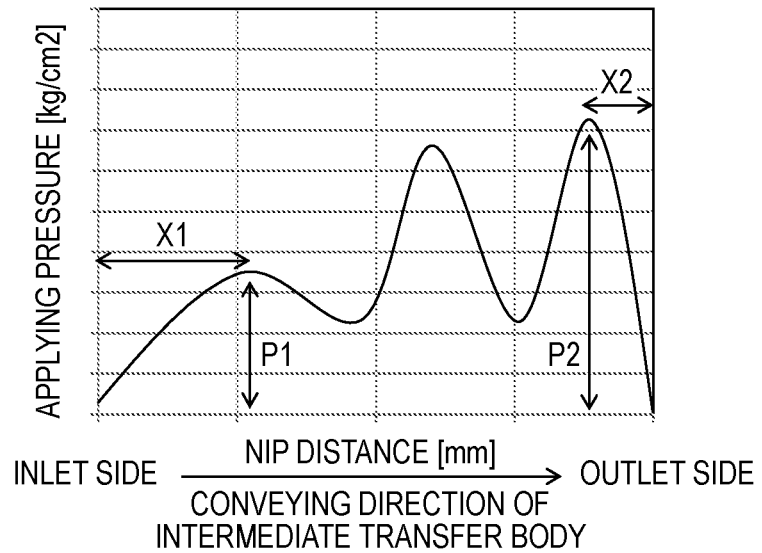
FIG. 7F shows a change in nip pressure in the nip part formed in the liquid component removing unit according to the present embodiment.

FIGS. 7B, 7C and 7E show schematic examples of profiles of the change in nip pressure obtainable by a form using a plurality of rollers as pressing members as shown in FIGS. 6E and 6F, respectively. In addition, FIG. 7D shows a schematic example of the profile of the change in nip pressure obtainable by changing the curvature of the curved surface portion contacting the liquid component removing belt of the pressing member.

By the configuration of using the pressing roller as the pressing member, abrasion of the liquid component removing belt 51 is suppressed. In addition, the first pressing roller 56 preferably has a diameter larger than that of the second pressing roller 57 so as to reduce a force in a direction to sweep up the image in the process that the transfer body 101 enters the nip. Further, at the time of nip peeling, in order to exert a force pulling up the liquid component toward the porous body, a contact pressure of the second pressing roller 57 with the transfer body 101 is preferably set to be higher than the contact pressure of the first pressing roller 56 with the transfer body (A schematic example of a profile of the change in nip pressure is shown in FIGS. 7C and 7E).

As shown in FIGS. 7A, 7C, 7E, and 7F, it is preferable that a pressure peak close to an outlet side of the transfer body 101 in a liquid component removing step is a maximum pressure among contact pressures of the liquid component removing belt 51 and the ink receiving medium.

(Application Time)

An application time in which the liquid absorbing member 105a is in contact with the first image is preferably within 50 ms (milliseconds) in order to further suppress adhesion of a coloring material in the first image to the liquid absorbing member. In addition, when the application time is 3 ms or more, it is preferable since the liquid absorbing member 105a can be in contact with the first image stably. In addition, the application time in the present specification is calculated by dividing a pressure sensing width in a direction in which the ink receiving medium moves by a moving speed of the ink receiving medium in the above-described surface pressure measurement. Hereinafter, this application time is referred to as a liquid absorbing nip time.

In this way, on the transfer body 101, the liquid component is absorbed from the first image, and a second image in which the liquid component is reduced is formed. The second image is then transferred onto the printing medium 108 in a transfer unit. An apparatus configuration and condition during transfer are described.

<Pressing Member for Transferring>

In the present embodiment, while the second image is in contact with the printing medium 108 being conveyed by a printing medium conveying means 107, a pressing member 106 for transferring presses the printing medium 108, and thus an ink image is transferred onto the printing medium 108. The transfer onto the printing medium 108 after removal of the liquid component included in the first image on the transfer body 101 can obtain a printed image in which curling and cockling, or the like, is suppressed.

The pressing member 106 needs to have a structural strength to some degree from the viewpoints of conveyance accuracy and durability of the printing medium 108. For a material of the pressing member 106, metal, ceramic, resin, or the like, is preferably used. Among them, particularly, to enhance responsiveness of control by reducing an inertia during operation in addition to rigidity and dimensional accuracy that can withstand pressurization at the time of transfer, aluminum, iron, stainless steel, acetal resin, epoxy resin, polyimide, polyethylene, polyethylene terephthalate, nylon, polyurethane, silica ceramics, alumina ceramics are preferably used. In addition, these materials may be used in combination.

A time during which the pressing member 106 presses the printing medium 108 to transfer the second image on the transfer body 101 is not specifically limited, but is preferably 5 ms or more and 100 ms or less to perform transfer appropriately and prevent impairing of durability of the transfer body. Further, the time of pressing in the present embodiment refers to a time during which the printing medium 108 is in contact with the transfer body 101, and is calculated by performing a surface pressure measurement with a surface pressure distribution measuring device (I-SCAN, manufactured by Nitta Corporation) and dividing a length in a conveying direction of a pressed region by a conveying speed.

In addition, a pressure in which the pressing member 106 presses the printing medium 108 to transfer the second image on the transfer body 101 is not particularly limited as long as the transfer is appropriately performed and durability of the transfer body is not impaired. To satisfy these requirements, the pressure is preferably 9.8 N/cm$^2$ (1 kgf/cm$^2$) or more and 294.2 N/cm$^2$ (30 kgf/cm$^2$) or less. In addition, the pressure in the present embodiment refers to a nip pressure between the printing medium 108 and the transfer body 101, and is calculated by performing a surface pressure measurement with a surface pressure distribution measuring device and dividing a weight in a pressed region by an area.

A temperature at which the pressing member 106 presses the printing medium 108 to transfer the second image on the transfer body 101 is not specifically limited, but is preferably a glass transition point or higher or a softening point or higher of a resin component included in the ink. Further, heating is preferably performed with a heating unit that heats the second image on the transfer body 101, the transfer body 101, and the printing medium 108.

The transfer means 106 is not particularly limited in view of a shape, and for example, may have a roller shape.

<Printing Medium and Printing Medium Conveying Device>

In the present embodiment, the printing medium 108 is not particularly limited, and any known printing medium may be used. As the printing medium, a long object wound in a roll form or a sheet material cut into a predetermined size can be included. Examples of a material for the printing medium include paper, a plastic film, a wooden board, a corrugated cardboard, and a metal film, and the like.

In addition, in FIG. 1, the printing medium conveying means 107 for conveying the printing medium 108 is configured to include a printing medium feeding roller 107a and a printing medium winding roller 107b, but the printing medium conveying means 107 only needs to convey the printing medium, and is not limited to this configuration.

<Control System>

Figure 3:
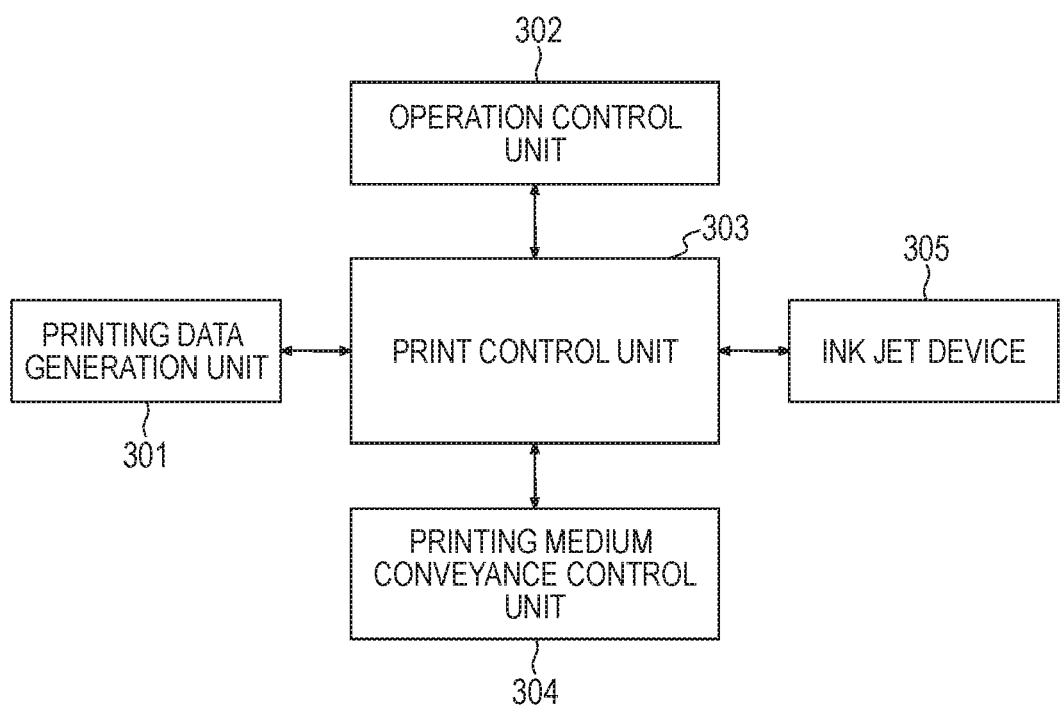
FIG. 3 is a block diagram showing a control system of the entire apparatus in the ink jet printing apparatus shown in FIGS. 1 and 2.

A transfer type ink jet printing apparatus according to the present embodiment includes a control system that controls each device. FIG. 3 is a block diagram showing a control system of the entire apparatus in the transfer type ink jet printing apparatus shown in FIG. 1. In FIG. 3, reference numeral 301 denotes a printing data generation unit such as an external print server, and the like, reference numeral 302 denotes an operation control unit such as an operation panel, and the like, reference numeral 303 denotes a print control unit to perform a printing process, reference numeral 304 denotes a printing medium conveyance control unit to convey a printing medium, and reference numeral 305 denotes an ink jet device to perform printing.

Figure 4:
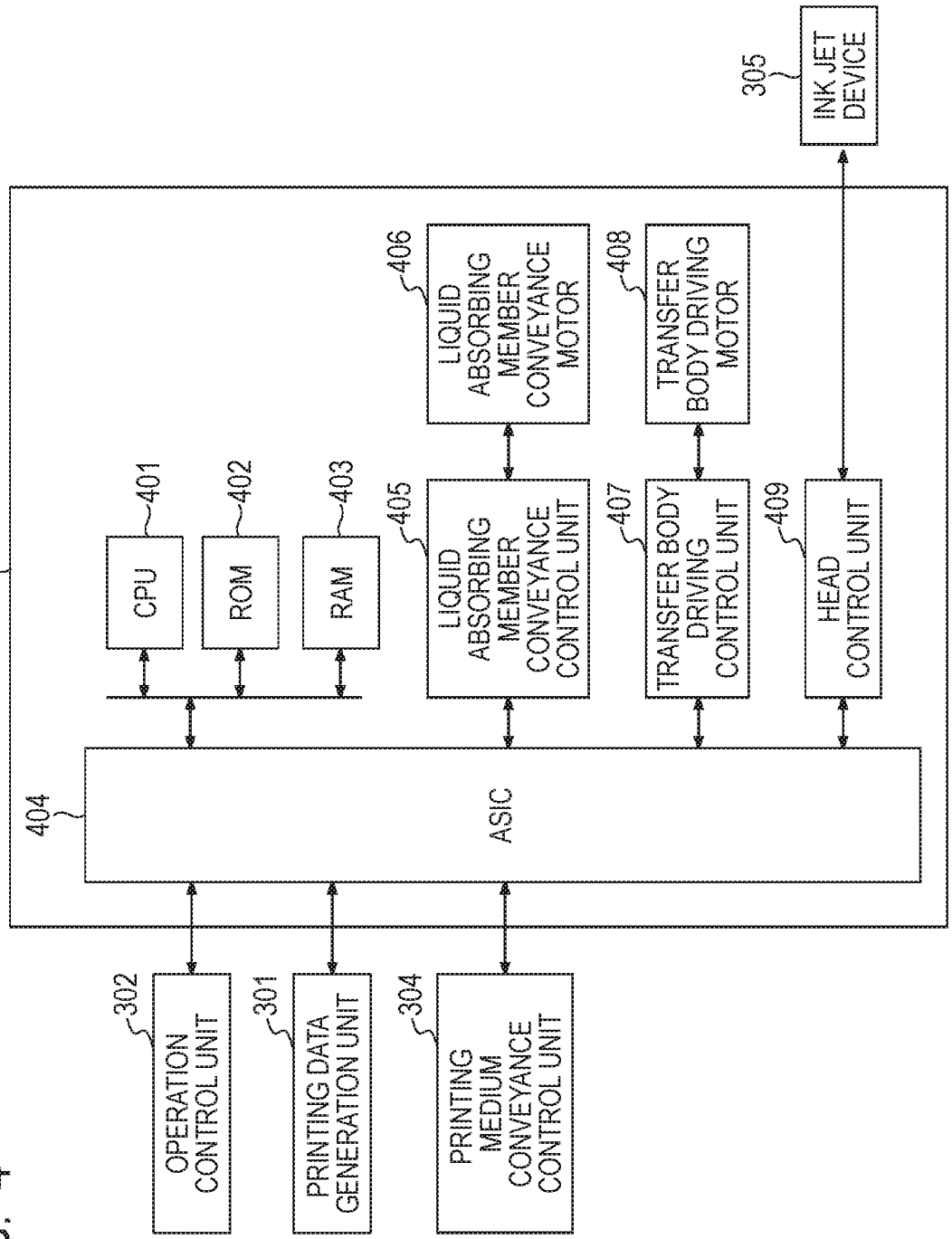
FIG. 4 is a block diagram of a print control unit in the transfer type ink jet printing apparatus shown in FIG. 1.

FIG. 4 is a block diagram of a print control unit in the transfer type ink jet printing apparatus shown in FIG. 1.

Reference numeral 401 denotes a CPU to control the entire printer, reference numeral 402 denotes a ROM to store a control program of the CPU, and reference numeral 403 denotes a RAM to execute a program. Reference numeral 404 denotes an application specific integrated circuit (ASIC) incorporating a network controller, a serial IF controller, a controller for generating a head data, and a motor controller, and the like. Reference numeral 405 denotes a conveyance control unit for liquid absorbing member to drive a conveyance motor 406 for liquid absorbing member, and is subjected to command control by the ASIC 404 through a serial IF. Reference numeral 407 denotes a transfer body drive control unit to drive a transfer body driving motor 408, and similarly, is subjected to command control by the ASIC 404 through the serial IF. Reference numeral 409 denotes a head control unit to perform generation of final ejection data of the ink jet device 305, generation of a driving voltage, and the like.

(Direct Drawing Type Ink Jet Printing Apparatus)

As another embodiment of the present invention, a direct drawing type ink jet printing apparatus will be described. In the direct drawing type ink jet printing apparatus, an ink receiving medium is a printing medium on which an image is to be formed.

Figure 2:
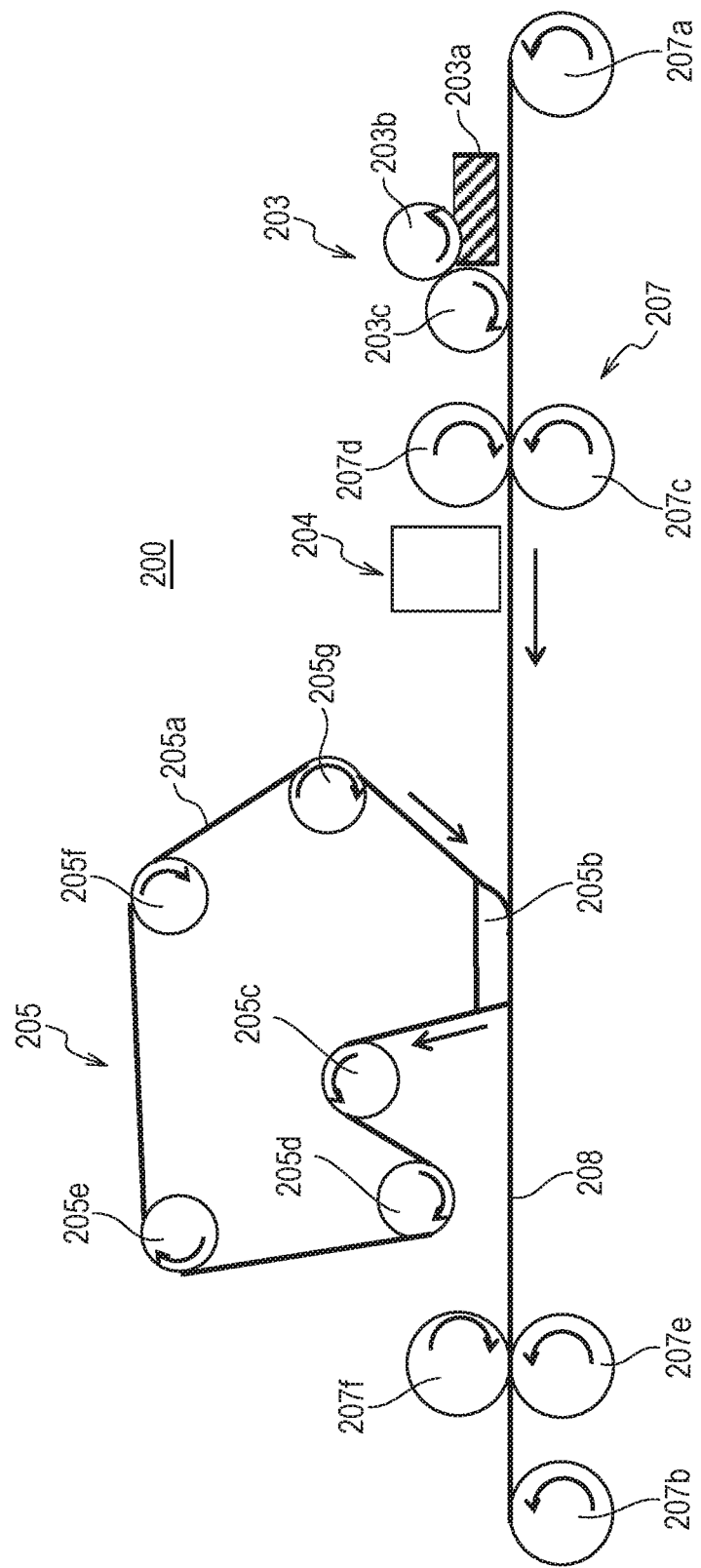
FIG. 2 is a schematic diagram showing an example of a configuration of a direct drawing type ink jet printing apparatus according to an embodiment of the present invention.

FIG. 2 is a schematic diagram showing an example of a configuration of a direct drawing type ink jet printing apparatus 200 according to the present embodiment. As compared to the above-described transfer type ink jet printing apparatus, the direct drawing type ink jet printing apparatus includes the same units as those of the transfer type ink jet printing apparatus except that the direct drawing type ink jet printing apparatus does not include the transfer body 101, the support member 102, and the transfer body cleaning means 109 and forms an image on the printing medium 208.

Thus, the reaction liquid applying device 203 that applies a reaction liquid onto the printing medium 208, the ink applying device 204 that applies an ink onto the printing medium 208, and the liquid absorbing device 205 that absorbs the liquid component included in the first image by using the liquid absorbing member 205a that is in contact with the first image on the printing medium 208 each have the same configuration as those of the transfer type ink jet printing apparatus, and thus description thereof will be omitted.

In addition, in the direct drawing type ink jet printing apparatus according to the present embodiment, the liquid absorbing device 205 includes the liquid absorbing member 205a, and a pressing member 205b for liquid absorption that presses the liquid absorbing member 205a against the first image on the printing medium 208. In addition, the liquid absorbing member 205a and the pressing member 205b are not particularly limited in view of shapes, and may have the same shapes as those of the liquid absorbing member and the pressing member that can be used in the transfer type ink jet printing apparatus. Further, the liquid absorbing device 205 may include an extending member that extends the liquid absorbing member.

In FIG. 2, reference numerals 205c, 205d, 205e, 205f, and 205g denote extending rollers serving as extending members. The number of extending rollers is not limited to five in FIG. 4, and any necessary number of the extending rollers may be disposed depending on apparatus design. In addition, there may be installed an ink applying unit that applies an ink onto the printing medium 208 by the ink applying device 204, and may be provided a printing medium support member, which is not shown, that supports the printing medium from below at a location opposite to the liquid component removing unit that removes the liquid component by contacting the liquid absorbing member 205a with the first image on the printing medium.

<Printing Medium Conveying Device>

In a direct drawing type ink jet printing apparatus according to the present embodiment, a printing medium conveying device 207 constitutes a conveying unit of a printing medium which is an ink receiving medium. The configuration of the printing medium conveying device 207 is not particularly limited, and a known conveying unit in a direct drawing type ink jet printing apparatus can be used. For example, as shown in FIG. 2, a printing medium conveying device including a printing medium feeding roller 207a, a printing medium winding roller 207b, and printing medium conveying rollers 207c, 207d, 207e, and 207f may be used.

<Control System>

The direct drawing type ink jet printing apparatus according to the present embodiment includes a control system to control each device. FIG. 3 shows a block diagram of the control system of the entire apparatus in the direct drawing type ink jet printing apparatus shown in FIG. 2, which is the same as the transfer type ink jet printing apparatus shown in FIG. 1.

Figure 5:
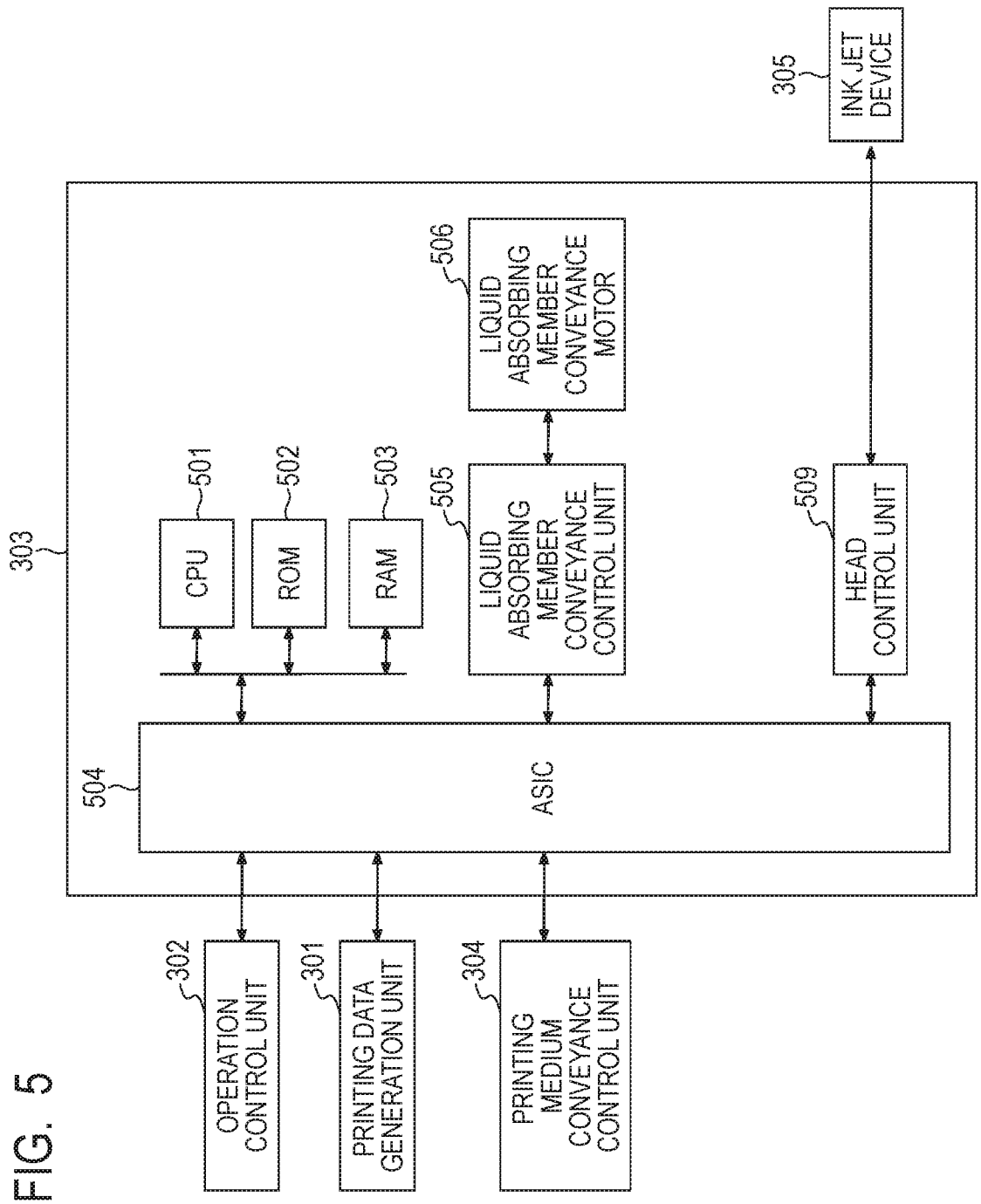
FIG. 5 is a block diagram of a print control unit in the direct drawing type ink jet printing apparatus shown in FIG. 2.

FIG. 5 is a block diagram of a print control unit in the direct drawing type ink jet printing apparatus shown in FIG. 2. The block diagram shown in FIG. 5 is the same as the block diagram of the print control unit in the transfer type ink jet printing apparatus shown in FIG. 4, except that the print control unit does not include a transfer body driving control unit 407 and a transfer body driving motor 408. In other words, reference numeral 501 denotes a CPU to control the entire printer, reference numeral 502 denotes a ROM to store a control program of the CPU, and reference numeral 503 denotes a RAM to execute a program. Reference numeral 504 denotes an ASIC incorporating a network controller, a serial IF controller, a controller for generating a head data, and a motor controller, and the like. Reference numeral 505 denotes a conveyance control unit for liquid absorbing member to drive a conveyance motor 506 for liquid absorbing member, and is subjected to command control by the ASIC 504 through a serial IF. Reference numeral 509 denotes a head control unit to perform generation of final ejection data of the ink jet device 305, generation of a driving voltage, and the like.

EXAMPLE

Hereinafter, the present invention is described in more detail with reference to Examples and Comparative Examples. The present invention is not limited to the following examples, unless exceeding the gist thereof. In addition, in the following description of the Examples, "part" is based on mass unless otherwise specified.

In the present Example, the transfer type ink jet printing apparatus shown in FIG. 1 was used.

The transfer body 101 of the present Example is fixed to a support member 102 with an adhesive. In the present Example, a sheet in which a PET sheet with a thickness of 0.5 mm was coated with silicone rubber (KE12, manufactured by Shin-Etsu Chemical Co., Ltd.) to have a thickness of 0.3 mm was used as an elastic layer of a transfer body J. In addition, a mixture of a condensate obtained by mixing glycidoxypropyl triethoxysilane and methyltriethoxysilane at a molar ratio of 1:1, followed by heat refluxing, and a cationic photopolymerization initiator (SP150, manufactured by ADEKA Corporation) was prepared. An atmospheric pressure plasma treatment was performed in such a manner that a contact angle of water on a surface of the elastic layer was 10 degrees or less. Thereafter, the mixture was applied onto the elastic layer to form a film with UV irradiation (with a high-pressure mercury lamp having a cumulative exposure amount of 5000 mJ/cm$^2$) and heat curing (at 150° C. for 2 hours), thereby producing a transfer body 101 in which a surface layer with a thickness of 0.5 μm was formed on the elastic layer.

In the present configuration, even though not shown for simplicity of description, a double sided tape was used to hold the transfer body 101 between the transfer body 101 and the support member 102. In addition, in the present configuration, a surface of the transfer body 101 was kept at 60° C. by a heater which is not shown.

A reaction liquid applied by the reaction liquid applying means 103 had the composition below. An application amount of the reaction liquid was 1 g/m$^2$.

| | |
|---|---|
| Glutaric acid | 21.0 mass % |
| Glycerin | 5.0 mass % |
| Surfactant (F-444, manufactured by DIC Corporation) | 5.0 mass % |
| Ion-exchange water | balance |

The ink was prepared in the following manner.

<Preparation of Pigment Dispersion>

First, 10 parts of carbon black (MONARCH 1100, manufactured by Cabot Corporation), 15 parts of a resin aqueous solution (an aqueous solution of a styrene-ethyl acrylate-acrylic acid copolymer having an acid value of 150, a weight average molecular weight (Mw) of 8,000, and a resin content of 20.0 mass % neutralized with a potassium hydroxide aqueous solution), and 75 parts of pure water were mixed. This mixture was fed in a batch type vertical sand mill (manufactured by AIMEX Co., Ltd.), and the mill was charged with 200 parts of oxide zirconium beads having a diameter of 0.3 mm. These materials were dispersed for 5 hours while being cooled with water. This dispersion liquid was centrifuged so that coarse particles were removed, and then a black pigment dispersion having a pigment content of 10.0 mass % was obtained.

<Preparation of Resin Particle Dispersion>

First, 20 parts of ethyl methacrylate, 3 parts of 2,2'-azobis-(2-methylbutyronitrile), and 2 parts of n-hexadecane were mixed, and the mixture was stirred for 0.5 hours. This mixture was dropped to 75 parts of an 8% aqueous solution of a styrene-butyl acrylate-acrylic acid copolymer (having an acid value of 130 mgKOH/g, a weight average molecular weight (Mw) of 7,000), followed by stirring for 0.5 hours. Then, the resulting mixture was subjected to supersonic wave irradiation for 3 hours with a supersonic wave irradiator. Subsequently, the mixture was subjected to a polymerization reaction for 4 hours in a nitrogen atmosphere at 80° C., followed by cooling to room temperature. The reaction product was then filtered to produce a resin particle dispersion with a resin content of 25.0 mass %.

<Preparation of Ink>

The resin particle dispersion obtained above and the pigment dispersion were mixed with each component below. In addition, the indication "balance" for ion-exchange water refers to an amount in which the sum of all the components constituting the ink is 100.0 mass %.

| | |
|---|---|
| Pigment dispersion (with a coloring material content of 10.0 mass %) | 40.0 mass % |
| Resin particle dispersion | 20.0 mass % |
| Glycerine | 7.0 mass % |
| Polyethylene glycol (having a number-average molecular weight (Mn) of 1,000) | 3.0 mass % |
| Surfactant: Acetylenol E100 (manufactured by Kawaken Fine Chemicals Co., Ltd.) | 0.5 mass % |
| Ion-exchange water | balance |

These materials were sufficiently stirred to be dispersed, and then subjected to pressure filtration through a microfilter having a pore size of 3.0 μm (manufactured by Fujifilm Corporation), thereby preparing a black ink.

An ink applying means C used an ink jet head having a type which ejects an ink in an on-demand manner using an electrothermal converter, and an ink application amount was set to be 20 g/m².

A speed of the liquid absorbing member 105a was adjusted to be the same as a moving speed of the transfer body 101 by liquid absorbing member conveying rollers 105c, 105d, and 105e. In addition, so as to be the same as the moving speed of the transfer body 101, the printing medium 108 was conveyed by the printing medium feeding roller 107a and the printing medium winding roller 107b. In the present Example, the conveying speed was 0.2 m/s. As the printing medium 108, Aurora Coat paper (manufactured by Nippon Paper Industries Co., Ltd., with a basis weight of 104 g/m²) was used.

<Liquid Component Removing Method>

Next, with reference to FIG. 6A, a detailed configuration of a liquid component removing method in the present Example will be described. Arrows in the drawing indicate conveying direction of the transfer body 101.

As the liquid component removing belt 51 shown in FIG. 6A, a first porous body consisting of two layers of a first layer 1 and a second layer 2 was used. By contacting the first layer 1 of the liquid component removing belt 51 with an image not shown, the liquid component of the ink may be absorbed to concentrate the image. Regarding the pore diameter of the first layer 1, in the present Example, PTFE having a pore diameter of 0.2 μm and a thickness of 10 μm obtained by stretching the resin was used for the first layer 1, and a non-woven fabric formed of a PET material having a pore diameter of 20 μm and a thickness of 190 μm was used for the second layer 2. Then, the first layer and the second layer were hot-press laminated and integrated, which was used for the liquid component removing belt 51. In the present embodiment, a Gurley value defined by JIS P8117 of the liquid component removing belt 51 was 8 seconds. Table 1 summarizes a constitution of the liquid component removing belt 51.

TABLE 1

| | Ink liquid content removal Porous body composition | | | |
|---|---|---|---|---|
| | Material | Thickness | Pore diameter | Porosity |
| First layer | PTFE | 10 μm | 0.2 μm | 80% |
| Second layer | PET | 190 μm | 20 μm | 75% |
| Porous body after hot-press lamination and integration | | Gurley value: 8.0 s | | |

In addition, the liquid absorbing member 105a is adjusted to have the same speed as a moving speed of the transfer body 101 by conveying rollers 105c, 105d, and 105e that extend and convey the liquid component removing belt 51. In addition, so as to be the same as the moving speed of the transfer body 101, the printing medium 108 was conveyed by the printing medium feeding roller 107a and the printing medium winding roller 107b. In the present Example, the conveying speed was 0.7 m/s. As the printing medium 108, Aurora Coat paper (manufactured by Nippon Paper Industries Co., Ltd., with a basis weight of 104 g/m²) was used.

Further, the pressing member 55(a) for forming a nip between the liquid component removing belt 51 and the transfer body 101 shown in FIG. 6A was set to have a shape in which a curvature at the inlet side of the transfer body 101 at the curved surface portion was large (it might have a linear shape), and a curvature at the outlet side was small. A material of the pressing member 55 is not particularly limited, but POM was used to have a shape in which the curvature of the inlet side of the transfer body 101 was set to be R500 mm and the curvature of the outlet side of the transfer body 101 was set to be R5 mm. By this shape, a ratio A (=P1/X1) of a pressure peak P1 to a nip distance X1 from start of contact between the liquid component removing belt 51 and the transfer body 101 up to a pressure peak P1 close to an inlet side of the transfer body 101 was set to be smaller than a ratio B (=P2/X2) of a pressure peak P2 to a nip distance X2 from the pressure peak P2 close to the outlet side of the transfer body 101 up to separation. The outline of profile of the change in nip pressure is shown in FIG. 7A and a measured value of the pressure change is shown in FIG. 8A as Example 1.

The liquid component removing belt 51 was immersed in a wetting liquid consisting of 95 parts of ethanol and 5 parts of water and allowed to be permeated thereinto, then the obtained liquid was substituted with a liquid consisting of 100 parts of water, and then used for liquid removal.

The image obtained through the liquid absorption treatment was evaluated according to the criteria described below.

Examples 2 to 4

In Examples 2 to 4, so as to satisfy the above-described Relational Expressions (1) to (3), curvature on an inlet side of the transfer body 101 and curvature on an outlet side were changed in a curved surface portion of the pressing member and the level was divided. Except for the above change, the image formation and evaluation of the formed image were performed in the same manner as in Example 1.

Example 5

Using the pressing member in Example 3, the angle and pressure with respect to the transfer body 101 were adjusted. Except for the above adjustment, the image formation and evaluation of the formed image were performed in the same manner as in Example 1.

Comparative Examples 1 and 3

By using one pressing roller in the liquid component removing step, a pressure ratio A from start of contact between the liquid component removing belt 51 and the transfer body 101 up to when arriving at a pressure peak close to the inlet side of the transfer body 101 was adjusted to be the same as a pressure ratio B from a pressure peak close to the outlet side of the transfer body 101 up to separation. Except for the above, the image formation and evaluation of the formed image were performed in the same manner as in Example 1.

Comparative Example 2

A curvature of the inlet side and a curvature of the outlet side of the transfer body 101 in the curved surface portion of the pressing member were changed so that a pressure ratio A from start of contact between the liquid component removing belt 51 and the transfer body 101 up to when arriving at a pressure peak close to an inlet side of the transfer body 101 was smaller than a pressure ratio B from a pressure peak close to an outlet side of the transfer body 101 up to separation. Except for the above change, evaluation of the formed image was performed in the same manner as in Example 1.

FIG. 8A shows a relationship between a nip distance and pressure in the liquid component removing step in Examples 1 to 5. Further, FIG. 8B shows a relationship between a nip distance and pressure in the liquid component removing step in Comparative Examples 1 to 3.

[Evaluation]

In each of Examples and Comparative Examples, occurrence of image disturbance due to sweeping up of the image after liquid removal treatment and a liquid component removal rate were evaluated.

(Image Disturbance)

Images after liquid removal treatment were observed and evaluated according to the following criteria.
No image disturbance due to sweeping up of image:A
Image disturbance occurred due to sweeping up only the rear end part of image:B
Image disturbance occurred due to sweeping up the entire image:C (Liquid Component Removal Rate)

A liquid component removal rate was calculated by the following Formula (A) from an ink injection amount W1, a transfer body weight amount W2 before the ink was injected and a transfer body weight amount W3 including the ink after the liquid component was removed.

$$\text{Liquid component removal rate [\%]} = (W1+W2-W3)/W1 \times 100 \quad \text{Formula (A)}$$

Evaluation was performed by the following criteria based on the obtained liquid component removal rate.
More desirable level of liquid component removal rate of 70% or more:A
Desirable level of liquid component removal rate of 40% or more and less than 70%:B
Level with liquid component removal rate less than 40%:C
The obtained evaluation results are shown in Table 2 below.

TABLE 2

| | Nip by pressing member shape | | | | | | Evaluation | | |
| | | | | | | | Ink application amount 20 g/cm2 | | |
| | Average pressure | X1 | X2 | Peak pressure | Pressure ratio A | Pressure ratio B | Image disturbance | Liquid removal rate | 10 g/cm2 |
| --- | --- | --- | --- | --- | --- | --- | --- | --- | --- |
| Example 1 | 3 kg/cm2 | 18 mm | 2 mm | 8.2 kg/cm2 | 0.5 | 4.1 | A | A | A |
| Example 2 | 3 kg/cm2 | 15 mm | 5 mm | 8.4 kg/cm2 | 0.6 | 1.7 | A | A | A |
| Example 3 | 3 kg/cm2 | 12 mm | 8 mm | 8.1 kg/cm2 | 0.7 | 1.0 | A | B | B |
| Example 4 | 3 kg/cm2 | 10 mm | 5 mm | 8.3 kg/cm2 | 0.8 | 1.7 | B | — (Image disturbance occurred, not measurable) | A |
| Example 5 | 3 kg/cm2 | 12 mm | 3 mm | 7.8 kg/cm2 | 0.7 | 2.7 | A | A | A |
| Comparative Example 1 | 3 kg/cm2 | 10 mm | 10 mm | 8.2 kg/cm2 | 0.8 | 0.8 | C | — (Image disturbance occurred, not measurable) | A |
| Comparative Example 2 | 3 kg/cm2 | 5 mm | 15 mm | 8.2 kg/cm2 | 1.6 | 0.5 | C | — (Image disturbance occurred, not measurable) | C |
| Comparative Example 3 | 5 kg/cm2 | 15 mm | 15 mm | 10 kg/cm2 | 0.7 | 0.7 | A | C | C |

Example 6

The same experiment was performed using not a transfer type but the direct drawing type ink jet printing apparatus that is shown in FIG. 2 in which a reaction liquid and ink are directly applied onto a printing medium. In image evaluation in the direct drawing type ink jet printing apparatus shown in FIG. 2, GLORIA PURE WHITE paper with a basis weight of 210 g/m² (manufactured by Gojo Paper Mfg. Co., Ltd.) was used as the printing medium.

A reaction liquid composition, a reaction liquid applying means 203, an ink composition, an ink applying means 204, a conveying speed of the printing medium, and a liquid removing means 205, except the printing medium, had the same condition as those of the transfer type ink jet printing apparatus used in Example 1. As a result, it was confirmed that the same results as in Table 2 were obtained.

As described above, according to the present invention, the nip pressure in the conveying direction of the ink receiving medium in the nip part of the nip part formed by the porous body for absorbing and removing the liquid component from the image and the ink receiving medium has a predetermined change. Due to this change in nip pressure, in a process of the ink receiving medium entering the nip part with the liquid absorbing member, force in a direction to sweep up the image to be processed as an absorption removal treatment target is reduced. Thus, disturbance of the image to be processed is suppressed by contacting the porous body included in the liquid absorbing member with the image to be processed. Furthermore, when peeling off the liquid absorbing member from the ink receiving medium from the nip part, force for pulling the liquid component toward the porous body is effectively applied. As a result, it is possible to achieve high absorption and removal of the liquid component from the image to be processed.

According to the present invention, there are provided an image forming apparatus and an image forming method capable of achieving high absorption and removal of a liquid component from an image without disturbing an image by contacting a liquid absorbing porous body with the image including the liquid component.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
    an image forming unit that forms a first image including a first liquid and a coloring material on an ink receiving medium;
    a liquid absorbing member that includes a porous body having a first surface and absorbing at least a portion of the first liquid from the first image, the first surface contacting the first image;
    a pressing member that causes pressing of the first image by applying pressure to the porous body of the liquid absorbing member such that the first surface of the porous body of the liquid absorbing member contacts a surface on which the first image of the ink receiving medium is formed so as to press the first image, and
    a conveying unit that conveys the ink receiving medium contacting the first image with the first surface of the porous body by passing the first image through a pressing part corresponding to the pressing member,
    wherein the applied pressure by the pressing member at a position of the first image increases by movement according to conveyance of the ink receiving medium by the conveying unit such that applied pressure between the ink receiving medium and the porous body reaches a pressure peak P1, and then becomes a pressure peak P2 and enters a released state in which the porous body and the ink receiving medium are separated, wherein the pressure peak P1 is a peak of the applied pressure at a position which is closer to a position of start of contact between the first surface of the porous body and the first image than a position where the applied pressure becomes the pressure peak P2, and wherein the pressure peak P2 is a peak of the applied pressure at a position which is closer to a position at which the porous body and the ink receiving medium are separated than the position where the applied pressure reaches the pressure peak P1, and
    wherein a ratio A (=P1/X1) of a height of the pressure peak P1 of the applied pressure between the ink receiving medium and the porous body to a distance X1 from the position of the start of contact between the first surface of the porous body and the first image to the position where the applied pressure reaches the pressure peak P1, is smaller than a ratio B (=P2/X2) of a height of the pressure peak P2 of the applied pressure between the ink receiving medium and the porous body to a distance X2 from the position where the applied pressure becomes the pressure peak P2 to the position where the porous body and the ink receiving medium are separated.

2. The image forming apparatus of claim 1, wherein the pressure peak P2 is a maximum pressure among contact pressures of the ink receiving medium and the porous body.

3. The image forming apparatus of claim 1, further comprising one or more pressing rollers that press the first surface and a second surface opposite to the first surface of the porous body to form the pressing part.

4. The image forming apparatus of claim 1, wherein the pressing member presses a second surface opposite to the first surface of the porous body in a sliding state to form the pressing part.

5. The image forming apparatus of claim 1, wherein the image forming unit includes (1) a first liquid applying unit that applies a first liquid composition including the first liquid or a second liquid onto the ink receiving medium; and
    (2) a second liquid applying unit that applies a second liquid composition including the first liquid or the second liquid and the coloring material onto the ink receiving medium,
    wherein at least one of the first liquid composition and the second liquid composition includes the first liquid, and
    wherein the first image includes a mixture of the first liquid composition and the second liquid composition and is viscously thicker than the first liquid composition and the second liquid composition.

6. The image forming apparatus of claim 5, wherein the second liquid composition is an aqueous pigment ink including water as the first liquid and at least a pigment as the coloring material, and the first liquid composition is a reaction liquid that reduces dispersion stability of the pigment in the aqueous pigment ink.

7. The image forming apparatus of claim 6, wherein the first liquid applying unit is an ink jet printing unit.

8. The image forming apparatus of claim 1, wherein the ink receiving medium is a transfer body that temporarily maintains the first image and a second image that is formed by absorbing the first liquid from the first image, and the second image on the transfer body is transferred onto a printing medium.

9. The image forming apparatus of claim 1, wherein the ink receiving medium is a printing medium for forming a final image, and on the printing medium, a second image in which at least a portion of the first liquid is removed from the first image by the liquid absorbing member is formed.

10. An image forming apparatus comprising:
an image forming unit that forms an ink image including an aqueous liquid component and a coloring material on an ink receiving medium;
a liquid absorbing member that includes a porous body having a first surface and absorbing at least a portion of the aqueous liquid component from the ink image, thereby concentrating an ink constituting the ink image, the first surface contacting the ink image;
a pressing member that causes pressing of the ink image by applying pressure to the porous body of the liquid absorbing member such that the first surface of the porous body of the liquid absorbing member contacts a surface on which the ink image of the ink receiving medium is formed so as to press the ink image, and
a conveying unit that conveys the ink receiving medium contacting the ink image with the first surface of the porous body by passing the ink image through a pressing part,
wherein the applied pressure by the pressing member at a position of the ink image increases by movement according to conveyance of the ink receiving medium by the conveying unit such that applied pressure between the ink receiving medium and the porous body reaches a pressure peak P1, and then becomes a pressure peak P2 and enters a released state in which the porous body and the ink receiving medium are separated, wherein the pressure peak P1 is a peak of the applied pressure at a position which is closer to a position of start of contact between the first surface of the porous body and the ink image than a position where the applied pressure becomes the pressure peak P2, and wherein the pressure peak P2 is a peak of the applied pressure at a position which is closer to a position at which the porous body and the ink receiving medium are separated than the position where the applied pressure reaches the pressure peak P1, and
wherein a ratio A (=P1/X1) of a height of the pressure peak P1 of the applied pressure between the ink receiving medium and the porous body to a distance X1 from the position of the start of contact between the first surface of the porous body and the ink image to the position where the applied pressure reaches the pressure peak P1, is smaller than a ratio B (=P2/X2) of a height of the pressure peak P2 of the applied pressure between the ink receiving medium and the porous body to a distance X2 from the position where the applied pressure becomes the pressure peak P2 to the position where the porous body and the ink receiving medium are separated.

11. An image forming method comprising:
an image forming step of forming a first image including a first liquid and a coloring material on an ink receiving medium; and
a liquid absorbing step of contacting a first surface of a porous body included in a liquid absorbing member with the first image to absorb at least a portion of the first liquid from the first image by the porous body,
wherein the liquid absorbing step is performed by applying pressure to the porous body of the liquid absorbing member such that the first surface of the porous body of the liquid absorbing member contacts a surface on which the first image of the ink receiving medium is formed so as to press the first image, and passing the first image through a pressing part to contact the first image with the first surface of the porous body, and
wherein the applied pressure at a position of the first image increases by movement according to conveyance of the ink receiving medium such that applied pressure between the ink receiving medium and the porous body reaches a pressure peak P1, and then becomes a pressure peak P2 and enters a released state in which the porous body and the ink receiving medium are separated, wherein the pressure peak P1 is a peak of the applied pressure at a position which is closer to a position of start of contact between the first surface of the porous body and the first image than a position where the applied pressure becomes the pressure peak P2, and wherein the pressure peak P2 is a peak of the applied pressure at a position which is closer to a position at which the porous body and the ink receiving medium are separated than the position where the applied pressure reaches the pressure peak P1, and
wherein a ratio A (=P1/X1) of a height of the pressure peak P1 of the applied pressure between the ink receiving medium and the porous body to a distance X1 from the position of the start of contact between the first surface of the porous body and the first image to the position where the applied pressure reaches the pressure peak P1, is smaller than a ratio B (=P2/X2) of a height of the pressure peak P2 of the applied pressure between the ink receiving medium and the porous body to a distance X2 from the position where the applied pressure becomes the pressure peak P2 to the position where the porous body and the ink receiving medium are separated.

12. The image forming method of claim 11, wherein the pressure peak P2 is a maximum pressure among contact pressures of the ink receiving medium and the porous body.

13. The image forming method of claim 11, wherein the pressing part is formed by one or more pressing rollers that press the first surface and a second surface opposite to the first surface of the porous body.

14. The image forming method of claim 11, wherein the pressing part is formed by a pressing member that presses a second surface opposite to the first surface of the porous body in a sliding state.

15. The image forming method of claim 11, wherein the image forming step includes (1) a first applying step of applying a first liquid composition including the first liquid or a second liquid onto the ink receiving medium; and
(2) a second applying step of applying a second liquid composition including the first liquid or the second liquid and the coloring material onto the ink receiving medium,
wherein at least one of the first liquid composition and the second liquid composition includes the first liquid, and
wherein the first image includes a mixture of the first liquid composition and the second liquid composition and is viscously thicker than the first liquid composition and the second liquid composition.

16. The image forming method of claim 15, wherein the second liquid composition is an aqueous pigment ink including water as the first liquid and at least a pigment as the coloring material, and the first liquid composition is a reaction liquid that reduces dispersion stability of the pigment in the aqueous pigment ink.

17. The image forming method of claim 16, wherein the aqueous pigment ink is applied onto the ink receiving medium by an ink jet method.

18. The image forming method of claim 11, wherein the ink receiving medium is a transfer body that temporarily maintains the first image and a second image that is formed by absorbing the first liquid from the first image, and the second image on the transfer body is transferred onto a printing medium.

19. The image forming method of claim 11, wherein the ink receiving medium is a printing medium for forming a final image, and on the printing medium, a second image in which at least a portion of the aqueous liquid component is removed from the first image is formed.

20. An image forming method comprising:
an image forming step of forming an ink image including an aqueous liquid component and a coloring material on an ink receiving medium; and
a liquid absorbing step of contacting a first surface of a porous body included in a liquid absorbing member with the ink image to absorb at least a portion of the aqueous liquid component from the ink image by the porous body, thereby concentrating an ink constituting the ink image,
wherein the liquid absorbing step is performed by applying pressure to the porous body of the liquid absorbing member such that the first surface of the porous body of the liquid absorbing member contacts a surface on which the ink image of the ink receiving medium is formed so as to press the ink image, and passing the ink image through a pressing part to contact the ink image with the first surface of the porous body, and
wherein the applied pressure at a position of the ink image increases by movement according to conveyance of the ink receiving medium such that applied pressure between the ink receiving medium and the porous body reaches a pressure peak P1, and then becomes a pressure peak P2 and enters a released state in which the porous body and the ink receiving medium are separated, wherein the pressure peak P1 is a peak of the applied pressure at a position which is closer to a position of start of contact between the first surface of the porous body and the ink image than a position where the applied pressure becomes the pressure peak P2, and wherein the pressure peak P2 is a peak of the applied pressure at a position which is closer to a position at which the porous body and the ink receiving medium are separated than the position where the applied pressure reaches the pressure peak P1, and
wherein a ratio A (=P1/X1) of a height of the pressure peak P1 of the applied pressure between the ink receiving medium and the porous body to a distance X1 from the position of start of contact between the first surface of the porous body and the ink image to the position where the applied pressure reached the pressure peak P1, is smaller than a ratio B (=P2/X2) of a height of the pressure peak P2 of the applied pressure between the ink receiving medium and the porous body to a distance X2 from the position where the applied pressure becomes the pressure peak P2 to the position where the porous body and the ink receiving medium are separated.

21. A pattern forming apparatus comprising:
a pattern forming unit that forms a pattern including a first liquid on a receiving medium;
a liquid absorbing member that includes a porous body having a first surface and absorbing at least a portion of the first liquid from the pattern, the first surface contacting the pattern;
a pressing member that causes pressing of the pattern by applying pressure to the porous body of the liquid absorbing member such that the first surface of the porous body of the liquid absorbing member contacts a surface on which the pattern of the receiving medium is formed so as to press the pattern; and
a conveying unit that conveys the receiving medium contacting the pattern with the first surface of the porous body by passing the pattern through a pressing part corresponding to the pressing member,
wherein the applied pressure by the pressing member at a position of the pattern increases by movement according to conveyance of the receiving medium by the conveying unit such that applied pressure between the receiving medium and the porous body reaches a pressure peak P1, and then becomes a pressure peak P2 and enters a released state in which the porous body and the receiving medium are separated, wherein the pressure peak P1 is a peak of the applied pressure at a position which is closer to a position of start of contact between the first surface of the porous body and the pattern than a position where the applied pressure becomes the pressure peak P2, and wherein the pressure peak P2 is a peak of the applied pressure at a position which is closer to a position at which the porous body and the receiving medium are separated than the position where the applied pressure reaches the pressure peak P1, and
wherein a ratio A (=P1/X1) of a height of the pressure peak P1 of the applied pressure between the receiving medium and the porous body to a distance X1 from the position of the start of contact between the first surface of the porous body and the pattern to the position where the applied pressure reaches the pressure peak P1, is smaller than a ratio B (=P2/X2) of a height of the pressure peak P2 of the applied pressure between the receiving medium and the porous body to a distance X2 from the position where the applied pressure becomes the pressure peak P2 to the position where the porous body and the receiving medium are separated.

* * * * *